US011840550B2

(12) United States Patent
Jeon et al.

(10) Patent No.: US 11,840,550 B2
(45) Date of Patent: Dec. 12, 2023

(54) SILYL-BIARYL PHOSPHORAMIDITES AND METHODS OF MAKING

(71) Applicant: Board of Regents, The University of Texas System, Austin, TX (US)

(72) Inventors: Junha Jeon, Southlake, TX (US); Hiep Hoang Nguyen, Arlington, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 17/366,374

(22) Filed: Jul. 2, 2021

(65) Prior Publication Data

US 2022/0002328 A1    Jan. 6, 2022

Related U.S. Application Data

(60) Provisional application No. 63/047,480, filed on Jul. 2, 2020.

(51) Int. Cl.
C07F 9/6584    (2006.01)
C07F 7/08    (2006.01)
C07F 9/6574    (2006.01)

(52) U.S. Cl.
CPC .......... *C07F 9/65842* (2013.01); *C07F 7/081* (2013.01); *C07F 7/0812* (2013.01); *C07F 7/0829* (2013.01); *C07F 9/65744* (2013.01)

(58) Field of Classification Search
None
See application file for complete search history.

(56) References Cited

PUBLICATIONS

Alexakis et al. "Biphenol-Based Phosphoramidite Ligands for the Enantioselective Copper-Catalyzed Conjugate Addition of Diethylzinc" J. Org. Chem., 2004, vol. 69, No. 17, pp. 5660-5667.*
Boele et al. "Bulky Monodentate Phosphoramidites in Palladium-Catalyzed Allylic Alkylation Reactions: Aspects of Regioselectivity and Enantioselectivity" Chemistry A European Journal, 2004, vol. 10, No. 24, pp. 6232-6246.*
Jindal et al. "Rational design of catalysts for asymmetric diamination reaction using transition state modeling" Organic & Biomolecular Chemistry, 2014, vol. 12, No. 17, pp. 2745-2753.*
McConathy, J.; Owens, M. J., Stereochemistry in Drug Action. Prim Care Companion J Clin Psychiatry 2003, 5, 70-73.
Baker, G. B .; Prior, T. I., Stereochemistry and drug efficacy and development: relevance of chirality to antidepressant and antipsychotic drugs. Annals of Medicine 2002, 34, 537-543.
Sekhon, B. S., Exploiting the Power of Stereochemistry in Drugs: An Overview of Racemic and Enantiopure Drugs. J. Mod. Med. Chem. 2013, 1, 10-36.
Hutt, A. G .; O'Grady, J., Drug chirality: a consideration of the significance of the stereochemistry of antimicrobial agents. Journal of Antimicrobial Chemotherapy 1996, 37, 7-32.

Brunel, J. M., Binol: A Versatile Chiral Reagent. Chemical Reviews 2005, 105, 857-898.
Chen, Y.; Yekta, S.; Yudin, A. K., Modified BINOL Ligands in Asymmetric Catalysis. Chemical Reviews 2003, 103, 3155-3212.
Teichert, J. F .; Feringa, B. L., Phosphoramidites: Privileged Ligands in Asymmetric Catalysis. Angewandte Chemie International Edition 2010, 49, 2486-2528.
Tang, W.; Zhang, X., New Chiral Phosphorus Ligands for Enantioselective Hydrogenation. Chemical Reviews 2003, 103, 3029-3070.
Feringa, B. L., Phosphoramidites: Marvellous Ligands in Catalytic Asymmetric Conjugate Addition. Accounts of Chemical Research 2000, 33, 346-353.
Hulst, R.; de Vries, N. K.; Feringa, B. L., α-Phenylethylamine based chiral phospholidines; new agents for the determination of the enantiomeric excess of chiral alcohols, amines and thiols by means of 31P NMR. Tetrahedron: Asymmetry 1994, 5, 699-708.
Cram, D. J.; Helgeson, R. C.; Peacock, S. C.; Kaplan, L. J.; Domeier, L. A.; Moreau, Koga, K.; Mayer, J. M.; Chao, Y., Host-guest complexation. 8. Macrocyclic polyethers shaped by two rigid substituted dinaphthyl or ditetralyl units. The Journal of Organic Chemistry 1978, 43, 1930-1946.
Kyba, E. P.; Gokel, G. W.; De Jong, F.; Koga, K.; Sousa, L. R.; Siegel, M. G.; Kaplan, L.; Sogah, G. D. Y.; Cram, D. J., Host-guest complexation. 7. The binaphthyl structural unit in host compounds. The Journal of Organic Chemistry 1977, 42, 4173-4184.
Cox, P. J.; Wang, W.; Snieckus, V., Expedient route to 3-and 3, 3-substituted 1, 1-bi-2-naphthols by directed ortho metalation and suzuki cross coupling methods. Tetrahedron Lett. 1992, 33, 2253-2256.
Maruoka, K.; Itoh, T.; Araki, Y.; Shirasaka, T.; Yamamoto, H., Efficient Synthesis of Sterically Hindered Chiral Binaphthol Derivatives. Bull. Chem. Soc. Jpn. 1988, 61, 2975-2976.
Nguyen, H. N.; Lee, H.; Audörsch, S.; Reznichenko, A. L.; Nawara-Hultzsch, A. J.; Schmidt, B.; Hultzsch, K. C., Asymmetric Intra- and Intermolecular Hydroamination Catalyzed by 3,3'-Bis(trisarylsilyl)- and 3,3'-Bis(arylalkylsilyl)-Substituted Binaphtholate Rare-Earth-Metal Complexes. Organometallics 2018, 37, 4358-4379.
Mercier, A.; Yeo, W. C.; Chou, J.; Chaudhuri, P. D.; Bernardinelli, G.; Kündig, E. P., Synthesis of highly enantiomerically enriched planar chiral ruthenium complexes viaPdcatalysed asymmetric hydrogenolysis. Chemical Communications 2009, 5227-5229.
Achard, M.; et al., Cobalt(I)-Catalyzed [6+2] Cycloadditions of Cyclooctatetra(tri)ene with Alkynes. J. Org. Chem. 2006, 71(7):2907-2910.
Hoen, R.; et al., Achiral Ligands Dramatically Enhance Rate and Enantioselectivity in the Rh/Phosphoramidite-Catalyzed Hydrogenation of α, β-Disubstituted Unsaturated Acids. Angewandte Chemie Intl. Ed. 2005, 44(27):4209-4212.
Kündig, E. P.; et al., Catalytic Enantioselective Hydrogenolysis of [Cr(CO)3(5,8-Dibromonaphthalene)]. Angewandte Chemie Intl. Ed. 2006, 45(7):1092-1095.
Sakakura, A.; et al., Enantioselective halocyclization of polyprenoids induced by nucleophilic phosphoramidites. Nature 2007, 445(7130):900-903.

(Continued)

*Primary Examiner* — Joseph R Kosack

(74) *Attorney, Agent, or Firm* — Meunier Carlin & Curfman LLC

(57) ABSTRACT

The present disclosure provides compounds that may be used as ligands in metal-catalyzed reactions, in particular 3,3'-bisilyl biaryl phosphoramidite compounds and processes for preparing the same.

3 Claims, 6 Drawing Sheets

(56) References Cited

PUBLICATIONS

Hua, Yuanda, et al. "Catalytic reductive ortho-C-H silylation of phenols with traceless, versatile acetal directing groups and synthetic applications of dioxasilines." Journal of the American Chemical Society 138.25 (2016): 7982-7991.

* cited by examiner

SILYL-BIARYL PHOSPHORAMIDITES AND METHODS OF MAKING

CROSS-REFERENCE TO RELATED APPLICATIONS

This application claims the benefit of priority to U.S. Provisional Application No. 63/047,480 filed Jul. 2, 2020, the disclosure of which is incorporated herein by reference in its entirety.

STATEMENT REGARDING FEDERALLY SPONSORED RESEARCH OR DEVELOPMENT

This invention was made with government support under R15GM116031 awarded by the National Institutes of Health. The Government has certain rights in the invention.

TECHNICAL FIELD

This disclosure relates to asymmetric ligands for catalysts, and more particularly to biaryl phosphoramidites and processes making the same.

BACKGROUND

The role of supporting ligands is increasingly important in modern transition metal catalysis. Metal-ligand coordination modifies the structure and reactivity of a metal catalyst, dictating both the stereofidelity and reactivity of catalytic transformations. Thus, in the last few decades, ligand design and development has been the main driving force for the discovery of new catalytic reactions and the improvement of known reactions. In order to build a large number of biologically relevant molecules that are chiral and exists enantio-enriched forms,[1-4] for example, requires successful development of asymmetric catalysis, which itself demands a large, readily-available set of chiral libraries for rapid reaction development and optimization.

Axially chiral 1,1'-binaphthalene-2,2'-diol (BINOL) and biphenols have been one of the most popular, reliable, and impactful ligands for a variety of enantioselective reactions used to access biologically relevant targets and materials.[5,6] In addition to being widely utilized in numerous important syntheses in academic settings, BINOLs have been one of the few chiral ligands that have been successfully applied in industrial scale processes.[6]

Phosphorous ligands have been wildly popular for use in asymmetric transformations.[7,8,9] Many mono- and bidentate phosphorous ligands possess a BINOL or biphenol backbone. Since the introduction of the monodentate chiral phosphoramidite Monophos by Feringa and coworkers in 1994, BINOL-based phosphoramidites have increasingly gained popularity due to their crucial roles in achieving high enantioselectivity in many asymmetric reactions.[7,10]

Recent studies have shown that modification of the 3- and 3'-positions of BINOL scaffolds substantially impacts stereoselectivity in many asymmetric reactions.[5,6] However, only a very limited number of 3,3'-bis-functionalized binaphthols and biphenols are currently available. For instance, only one 3,3'-bis-silyl binaphthol, 3,3'-bis(triphenyl silyl) binaphthol, is commercially available, but the prices are relatively high compared to BINOL. It is in part attributed to the required multi-step synthesis of this compound from BINOL.[6,11,12] Synthesis of 3,3'-bis-silyl BINOLs typically use one of two methods. Sterically less-demanding silanes can be introduced by Snieckus' di-lithiation of MOM-protected binapthol in the presence of HMPA followed by treatment with a trialkylchlorosilane.[13] Yamamoto's five-step sequence was developed to obviate the scope issue of the Snieckus method by exploiting a retro-Brook rearrangement. Although this strategy can be used to introduce hindered functional groups, it suffers from limited availability of the appropriate halosilanes.[14] Ojima and coworkers have demonstrated syntheses and synthetic applications of 3,3'-bis-functionalized biphenol-based phosphoramidites, prepared from commercially available, 3,3'-bis-functionalized biphenol, to several exemplary transition metal catalyzed asymmetric reactions. 3,3'-bis-functionalized biphenol-based phosphoramidites outperformed 3,3'-bis-hydro-biphenol-based phosphoramidites in terms of regio- and enantioselectivity. However, 3,3'-bis-functionalized BINOL-based phosphoramidite ligands are rare, presumably because of limited availability of the required precursors and lack of efficient synthetic protocols to functionalize the 3- and 3'-positions of BINOL (Achard, M.; et al., Cobalt(I)-Catalyzed [6+2] Cycloadditions of Cyclooctatetra(tri)ene with Alkynes. J. Org. Chem. 2006, 71(7): 2907-2910; Hoen, R.; et al., Achiral Ligands Dramatically Enhance Rate and Enantioselectivity in the Rh/Phosphoramidite-Catalyzed Hydrogenation of α,β-Disubstituted Unsaturated Acids. Angewandte Chemie Intl. Ed. 2005, 44(27):4209-4212; Kundig, E. P.; et al., Catalytic Enantioselective Hydrogenolysis of [Cr(CO)3(5,8-Dibromonaphthalene)]. Angewandte Chemie Intl. Ed. 2006, 45(7):1092-1095; Sakakura, A.; et al., Enantioselective halocyclization of polyprenoids induced by nucleophilic phosphoramidites. Nature 2007, 445(7130):900-903).

Current state-of-the-art strategies such as those described above are unable to provide a large library of such axially chiral ligands in an efficient manner because they typically involve multi-step reaction sequences, protecting group manipulation, multiple purifications of intermediates, and the risk of possible racemization. There is a clear need for additional chiral phosphorous ligands for use in asymmetric catalytic processes in addition to methods of making the same.

SUMMARY

The present disclosure provides silyl biaryl phosphoramidite compounds that are useful as ligands in metal-catalyzed asymmetric transformations, particularly as asymmetric ligands, in addition to processes for making said compounds.

Thus in one aspect, a compound is provided of Formula I:

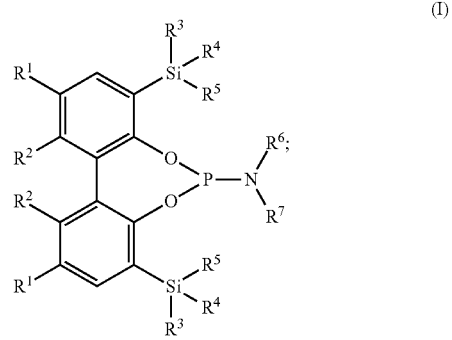

wherein all variables are as defined herein.

In an alternative aspect, a compound is provided of Formula II:

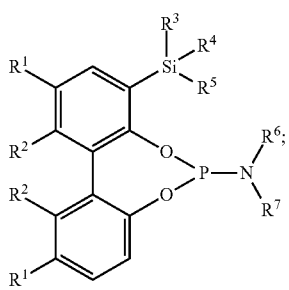

wherein all variables are as defined herein.

In further aspects, methods for the synthesis of compounds of Formula I are also provided.

In alternative aspects, methods for the synthesis of compounds of Formula I are also provided.

The details of one or more embodiments of the disclosure are set forth in the description below. Other features, objects, and advantages of the disclosure will be apparent from the description and drawings, and from the claims.

BRIEF DESCRIPTION OF THE FIGURES

The accompanying figures, which are incorporated in and constitute a part of this specification, illustrate several aspects described below.

DETAILED DESCRIPTION

Figure 1:
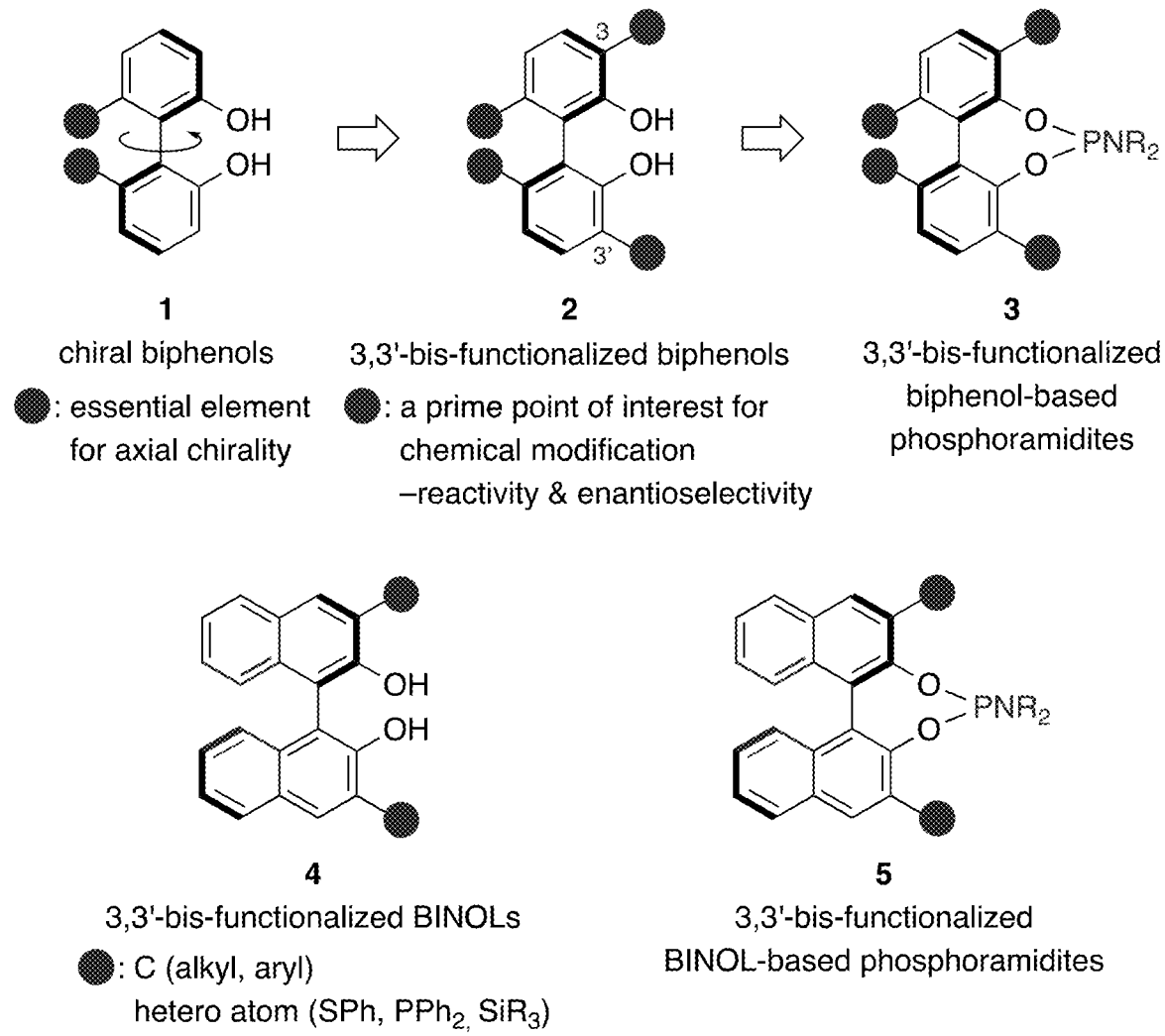
FIG. 1 shows synthetic routes to access axially chiral biphenols and axially chiral biphenol-based phosphoramidites.
Figure 2A:
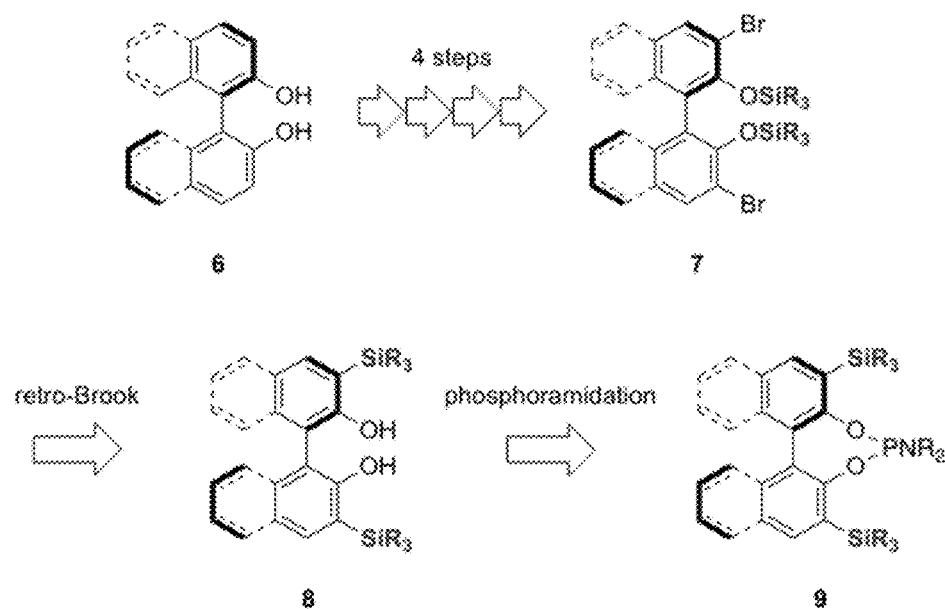
FIGS. 2A, 2B, and 2C show synthetic strategies toward design and development of axially chiral 3,3'-bis-functionalized BINOLs/biphenols and 3,3'-bis-functionalized BINOL/biphenol-based phosphoramidites.
Figure 2B:
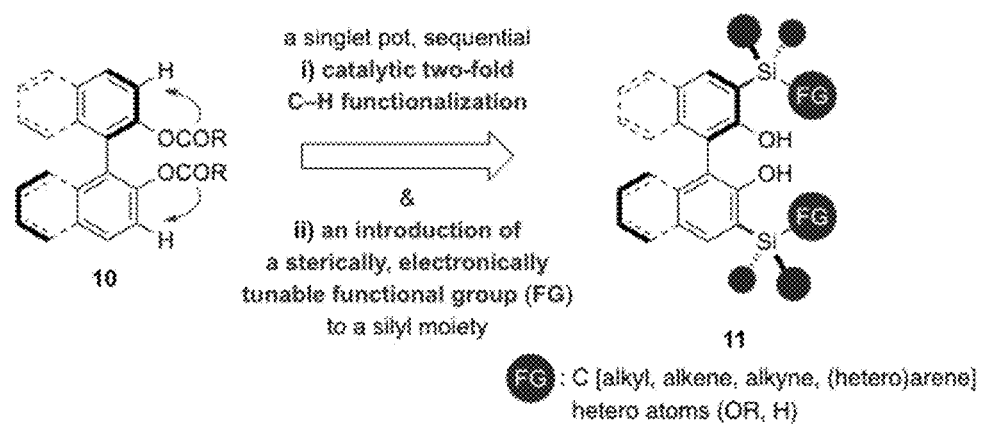
Figure 2B:
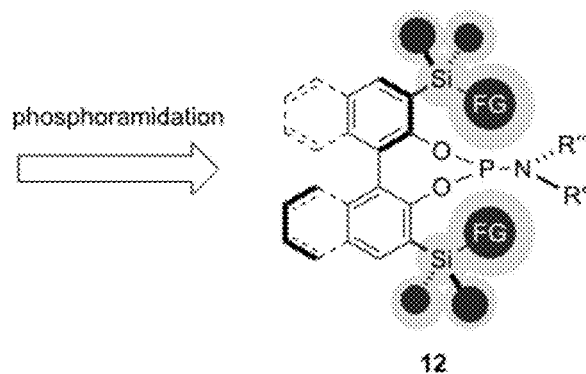
Figure 2C:
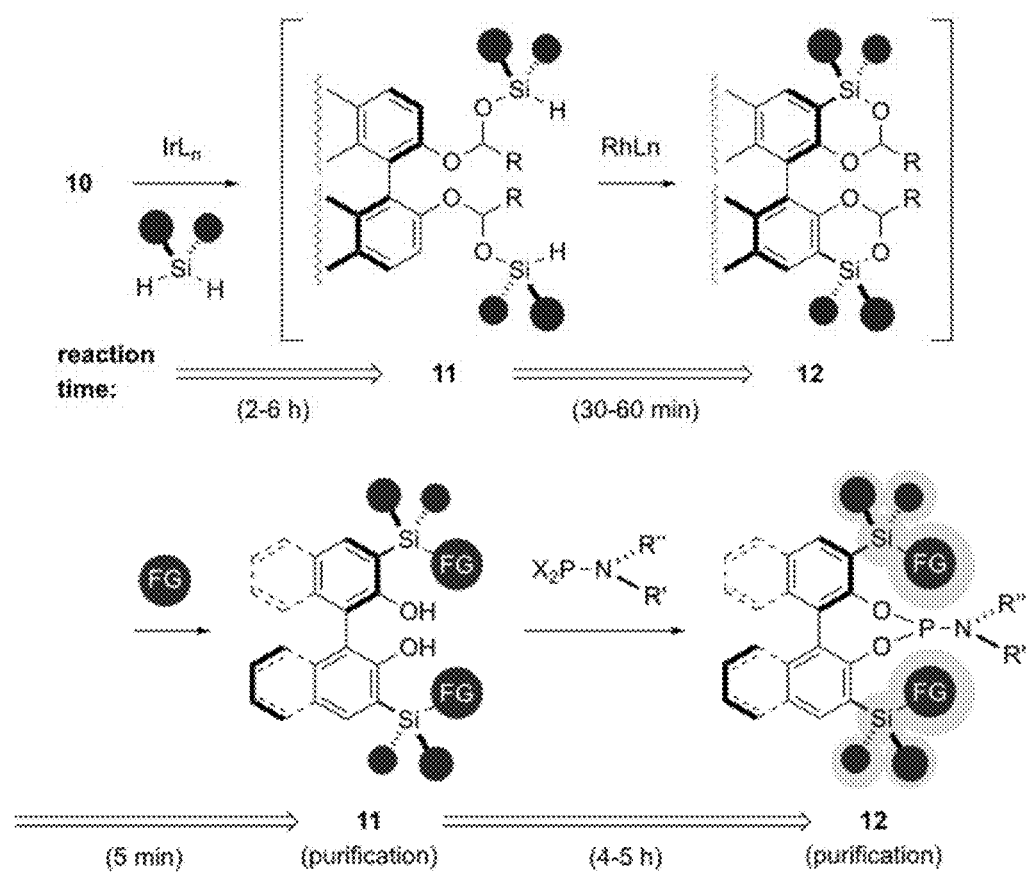
Figure 3:
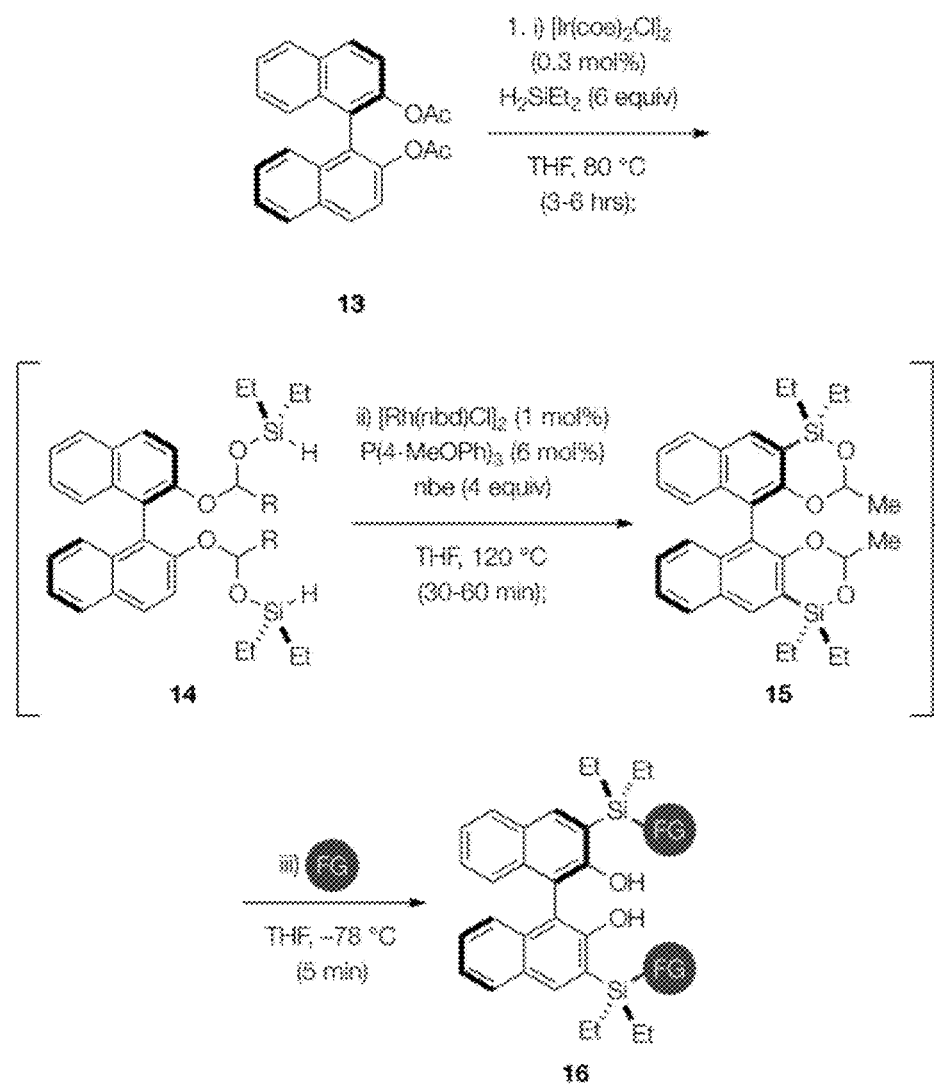
FIG. 3 shows a synthetic scheme for the prepareted of 3,3'-bis-silyl BINOLs via dual C—H silylation with a traceless acetal directing group.
Figure 4A:
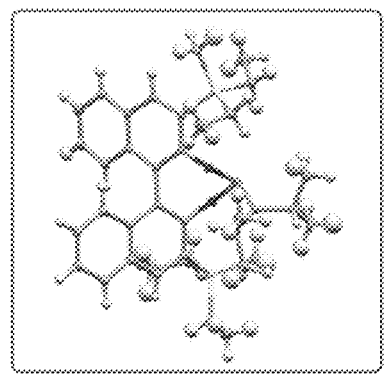
FIG. 4A is an X-ray crystallography structure of compound 20a as prepared in the examples.
Figure 4B:
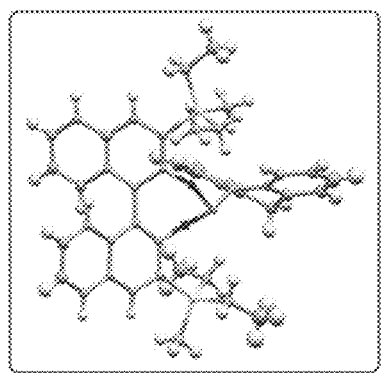
FIG. 4B is an X-ray crystallography structure of compound 20e as prepared in the examples.
Figure 4C:
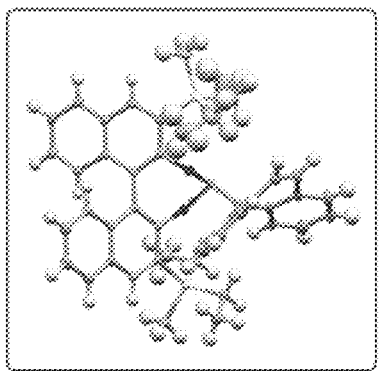
FIG. 4C is an X-ray crystallography structure of compound 20f as prepared in the examples.

A number of embodiments of the disclosure have been described. Nevertheless, it will be understood that various modifications may be made without departing from the spirit and scope of the invention. Accordingly, other embodiments are within the scope of the following claims.

Definitions

As used herein, the term "composition" is intended to encompass a product comprising the specified ingredients in the specified amounts, as well as any product which results, directly or indirectly, from combination of the specified ingredients in the specified amounts.

References in the specification and concluding claims to parts by weight of a particular element or component in a composition denotes the weight relationship between the element or component and any other elements or components in the composition or article for which a part by weight is expressed. Thus, in a mixture containing 2 parts by weight of component X and 5 parts by weight component Y, X and Y are present at a weight ratio of 2:5, and are present in such ratio regardless of whether additional components are contained in the mixture.

A weight percent (wt. %) of a component, unless specifically stated to the contrary, is based on the total weight of the formulation or composition in which the component is included.

As used herein, the term "substituted" is contemplated to include all permissible substituents of organic compounds. In a broad aspect, the permissible substituents include acyclic and cyclic, branched and linear, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

The term "aliphatic" as used herein refers to a non-aromatic hydrocarbon group and includes branched and unbranched, alkyl, alkenyl, or alkynyl groups.

The term "alkyl" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, nonyl, decyl, dodecyl, tetradecyl, hexadecyl, eicosyl, tetracosyl, and the like. The alkyl group can also be substituted or unsubstituted. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below. As described herein, "perfluoroalkyl" is an alkyl group as described herein where each hydrogen substituent on the group has been substituted with a fluorine atom. Representative but non-limiting examples of "perfluoroalkyl" groups include trifluoromethyl, pentafluoroethyl, or heptadecafluorooctyl.

The symbols $A^n$ is used herein as merely a generic substituent in the definitions below.

The term "alkoxy" as used herein is an alkyl group bound through a single, terminal ether linkage; that is, an "alkoxy" group can be defined as —$OA^1$ where $A^1$ is alkyl as defined above.

The term "alkenyl" as used herein is a hydrocarbon group of from 2 to 24 carbon atoms with a structural formula containing at least one carbon-carbon double bond. Asymmetric structures such as $(A^1A^2)C$=$C(A^3A^4)$ are intended to include both the E and Z isomers. This may be presumed in structural formulae herein wherein an asymmetric alkene is present, or it may be explicitly indicated by the bond symbol C=C. The alkenyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "alkynyl" as used herein is a hydrocarbon group of 2 to 24 carbon atoms with a structural formula containing at least one carbon-carbon triple bond. The alkynyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "aryl" as used herein is a group that contains any carbon-based aromatic group including, but not limited to, benzene, naphthalene, phenyl, biphenyl, phenoxybenzene, and the like. The term "heteroaryl" is defined as a group that contains an aromatic group that has at least one heteroatom incorporated within the ring of the aromatic group. Examples of heteroatoms include, but are not limited to, nitrogen, oxygen, sulfur, and phosphorus. The term "non-heteroaryl," which is included in the term "aryl," defines a group that contains an aromatic group that does not contain a heteroatom. The aryl and heteroaryl group can be substituted or unsubstituted. The aryl and heteroaryl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein. The cycloalkyl or heterocycloalkyl group can be fused with one or more aryl or heteroaryl rings.

The term "cycloalkenyl" as used herein is a non-aromatic carbon-based ring composed of at least three carbon atoms and containing at least one double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group as defined above where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein. The cycloalkenyl or heterocycloalkenyl group can be fused with one or more aryl or heteroaryl rings.

The term "aldehyde" as used herein is represented by the formula —C(O)H. Throughout this specification "C(O)" is a short hand notation for C=O.

The terms "amine" or "amino" as used herein are represented by the formula $NA^1A^2A^3$, where $A^1$, $A^2$, and $A^3$ can be, independently, hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "carboxylic acid" as used herein is represented by the formula —C(O)OH. A "carboxylate" as used herein is represented by the formula —C(O)O$^-$.

The term "ester" as used herein is represented by the formula —OC(O)$A^1$ or —C(O)O$A^1$, where $A^1$ can be an alkyl, halogenated alkyl, alkenyl, alkynyl, aryl, heteroaryl, cycloalkyl, cycloalkenyl, heterocycloalkyl, or heterocycloalkenyl group described above.

The term "ether" as used herein is represented by the formula $A^1OA^2$, where $A^1$ and $A^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "ketone" as used herein is represented by the formula $A^1C(O)A^2$, where $A^1$ and $A^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "halide" as used herein refers to the halogens fluorine, chlorine, bromine, and iodine.

The term "hydroxyl" as used herein is represented by the formula —OH.

The term "nitro" as used herein is represented by the formula —NO$_2$.

The term "cyano" as used herein is represented by the formula —CN

The term "azido" as used herein is represented by the formula —N$_3$.

The term "sulfonyl" is used herein to refer to the sulfo-oxo group represented by the formula —S(O)$_2A^1$, where $A^1$ can be hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "sulfonylamino" or "sulfonamide" as used herein is represented by the formula —S(O)$_2$NH$_2$.

The term "thiol" as used herein is represented by the formula —SH.

It is to be understood that the compounds provided herein may contain chiral centers. Such chiral centers may be of either the (R-) or (S-) configuration. The compounds provided herein may either be enantiomerically pure, or be diastereomeric or enantiomeric mixtures. It is to be understood that the chiral centers of the compounds provided herein may undergo epimerization in vivo. As such, one of skill in the art will recognize that administration of a compound in its (R-) form is equivalent, for compounds that undergo epimerization in vivo, to administration of the compound in its (S-) form.

As used herein, substantially pure means sufficiently homogeneous to appear free of readily detectable impurities as determined by standard methods of analysis, such as thin layer chromatography (TLC), nuclear magnetic resonance (NMR), gel electrophoresis, high performance liquid chromatography (HPLC) and mass spectrometry (MS), gaschromatography mass spectrometry (GC-MS), and similar, used by those of skill in the art to assess such purity, or sufficiently pure such that further purification would not detectably alter the physical and chemical properties, such as enzymatic and biological activities, of the substance. Both traditional and modern methods for purification of the compounds to produce substantially chemically pure compounds are known to those of skill in the art. A substantially chemically pure compound may, however, be a mixture of stereoisomers.

Unless stated to the contrary, a formula with chemical bonds shown only as solid lines and not as wedges or dashed lines contemplates each possible isomer, e.g., each enantiomer, diastereomer, and meso compound, and a mixture of isomers, such as a racemic or scalemic mixture.

Compounds

Thus, in one aspect, a compound is provided of Formula I:

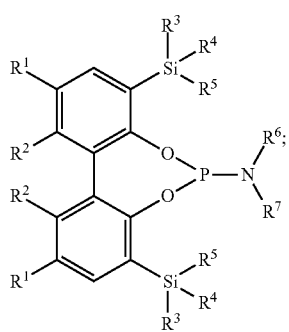

(I)

wherein:

$R^1$ and $R^2$ are independently selected at each occurrence from halo, nitro, cyano, azido, —$R^a$, —$OR^a$, —$SR^a$, —$NR^aR^b$, —$C(O)R^c$, —$OC(O)R^c$, —$N(R^b)$—$C(O)R^c$, —$S(O)R^c$, —$OS(O)R^c$, —$N(R^b)$—$S(O)R^c$, —$S(O)_2R^c$, —$OS(O)_2R^c$, and —$N(R^b)$—$S(O)_2R^c$;

or $R^1$ and $R^2$ are brought together with the carbons to which they are attached to form a cycloalkyl, heterocycloalkyl, cycloalkenyl, heterocycloalkenyl, aryl, or heteroaryl ring, each of which may be optionally substituted with one or more $R^x$ groups as allowed by valence;

$R^3$, $R^4$, and $R^5$ are each independently selected at each occurrence from a hydrogen, alkyl, alkenyl, alkynyl, —$OR^a$, cycloalkyl, heterocycloalkyl, cycloalkenyl, heterocycloalkenyl, aryl, and heteroaryl group, each of which except for hydrogen may be optionally substituted with one or more $R^y$ groups as allowed by valence;

$R^6$ and $R^7$ are each independently selected from an alkyl, alkenyl, alkynyl, cycloalkyl, heterocycloalkyl, cycloalkenyl, heterocycloalkenyl, aryl, or heteroaryl group, each of which may be optionally substituted with one or more $R^z$ groups as allowed by valence;

or $R^6$ and $R^7$ are brought together with the nitrogen to which they are attached to form a heterocycloalkyl, heterocycloalkenyl or heteroaryl ring, each of which may be optionally substituted one or more $R^z$ groups as allowed by valence;

$R^a$ and $R^b$ are independently selected at each occurrence from a hydrogen, alkyl, alkenyl, alkynyl, cycloalkyl, heterocycloalkyl, cycloalkenyl, heterocycloalkenyl, aryl, or heteroaryl group, each of which except for hydrogen may be optionally substituted with one or more $R^d$ groups as allowed by valence;

$R^c$ is independently selected at each occurrence from —$R^a$, —$OR^a$, or —$NR^aR^b$;

$R^d$ is independently selected at each occurrence from halo, azido, alkyl, alkoxy, alkenyl, alkynyl, cycloalkyl, cycloalkenyl, heterocycloalkyl, heterocycloalkenyl, aryl, heteroaryl, aldehyde, amino, carboxylic acid, ester, ether, halide, hydroxy, ketone, nitro, silyl, sulfo-oxo, sulfonyl, sulfone, sulfoxide, and thiol; and $R^x$, $R^y$, and $R^z$ are independently selected at each occurrence from halo, nitro, cyano, —$R^a$, —$OR^a$, —$SR^a$, —$NR^aR^b$, —$C(O)R^c$, —$OC(O)R^c$, —$N(R^b)$—$C(O)R^c$, —$S(O)R^c$, —$OS(O)R^c$, —$N(R^b)$—$S(O)R^c$, —$S(O)_2R^c$, —$OS(O)_2R^c$, and —$N(R^b)$—$S(O)_2R^c$.

In some embodiments, the compound of Formula I is selected from a compound of Formula Ia:

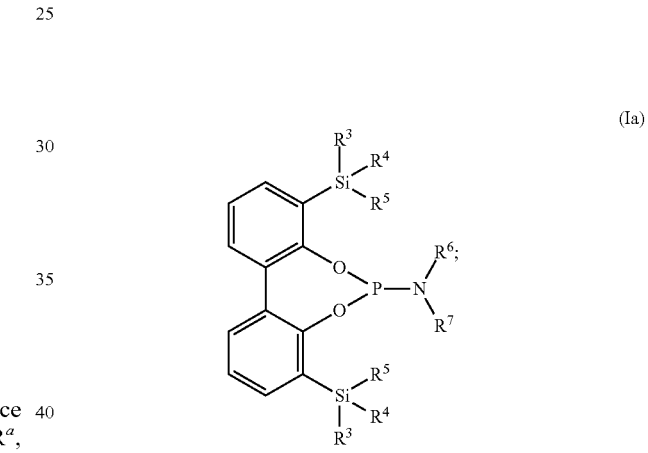

(Ia)

wherein all variables are as defined herein.

In some embodiments, the compound of Formula Ia is selected from:

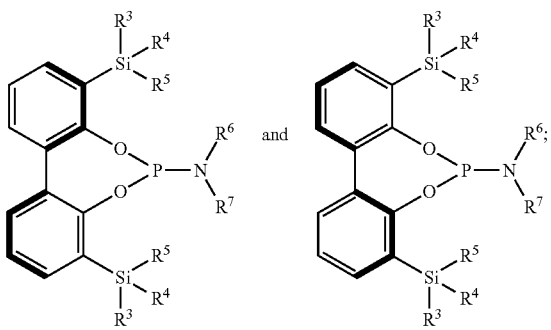

wherein all variables are as defined here.

In some embodiments, the compound of Formula I is selected from a compound of Formula Ib:

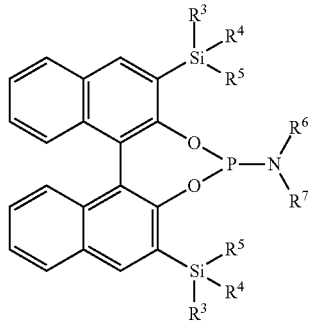

(Ib)

wherein all variables are as defined herein.

In some embodiments, the compound of Formula Ib is selected from:

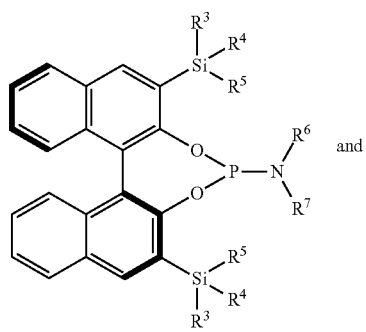

and

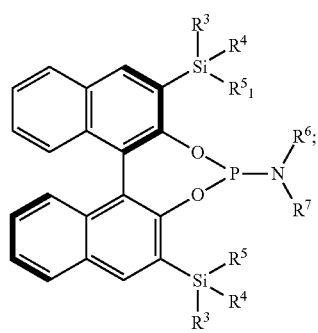

wherein all variables are as defined herein.

In some embodiments, the compound of Formula I is selected from a compound of Formula Ic:

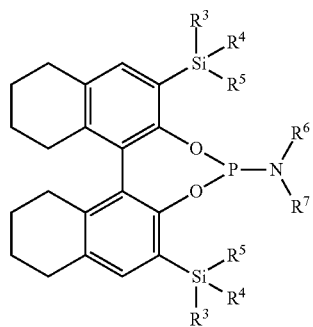

(Ic)

wherein all variables are as defined herein.

In some embodiments, the compound of Formula Ic is selected from:

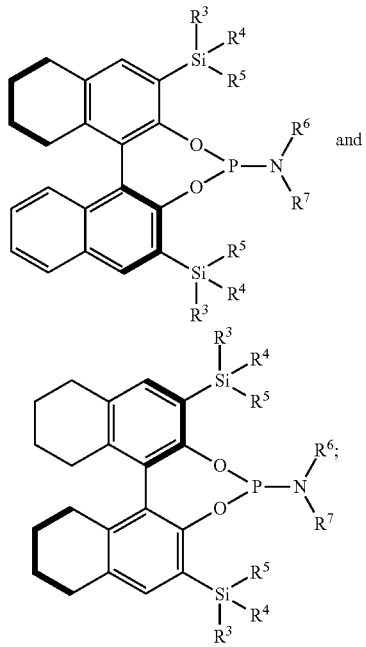

wherein all variables are as defined herein.

In some embodiments, the compound of Formula I is selected from a compound of Formula Id:

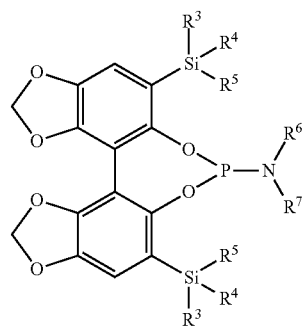

(Id)

wherein all variables are as defined herein.

In some embodiments, the compound of Formula Id is selected from:

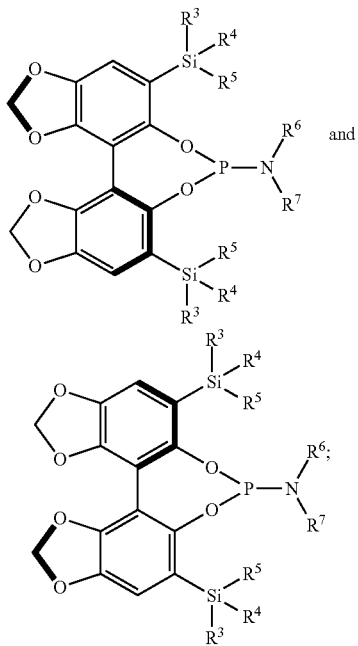

and wherein all variables are as defined herein.

In some embodiments, the compound of Formula I is a compound of Formula Ie:

(Ie)

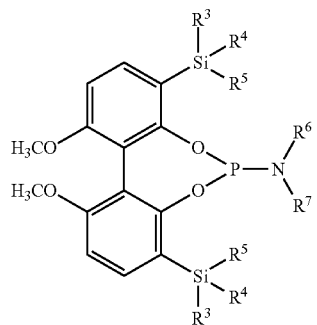

wherein all variables are as defined herein.

In some embodiments, the compound of Formula Ie is selected from:

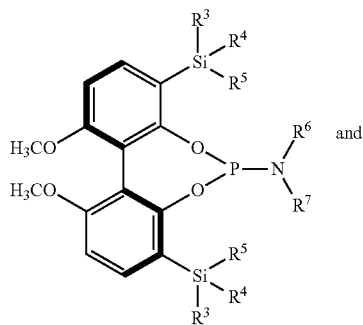

and

-continued

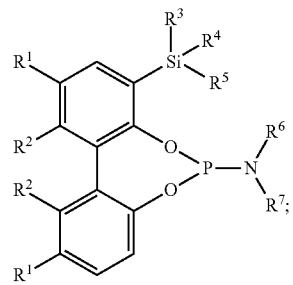

Wherein all variables are as defined herein.

In an alternative aspect, a compound is provided of Formula II:

(II)

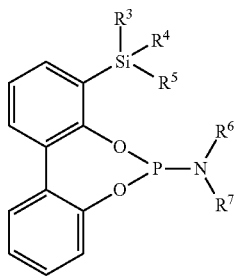

Wherein all variables are as defined herein.

In some embodiments, the compound of Formula II is selected from a compound of Formula IIa:

(IIa)

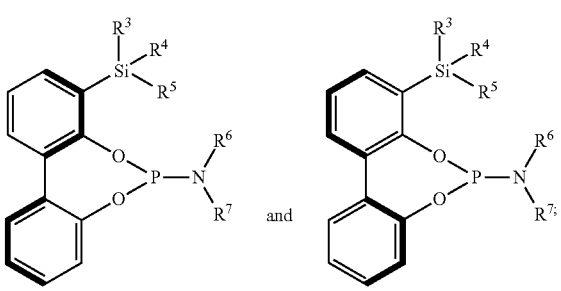

wherein all variables are as defined herein.

In some embodiments, the compound of Formula IIa is selected from:

and wherein all variables are as defined here.

In some embodiments, the compound of Formula II is selected from a compound of Formula IIb:

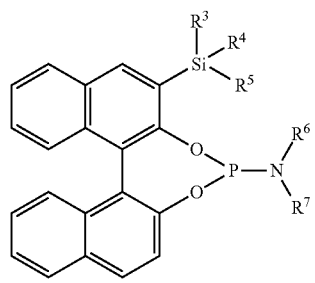
(IIb)

wherein all variables are as defined herein.

In some embodiments, the compound of Formula IIb is selected from:

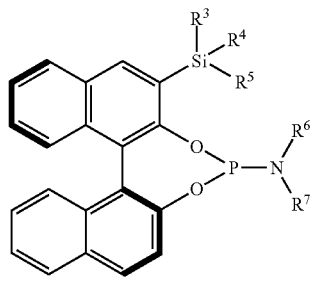

and

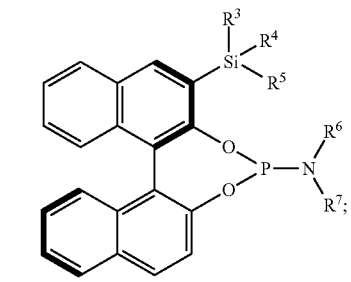

wherein all variables are as defined herein.

In some embodiments, the compound of Formula II is selected from a compound of Formula IIc:

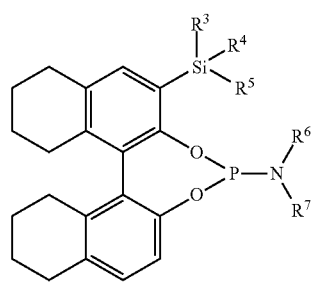
(IIc)

wherein all variables are as defined herein.

In some embodiments, the compound of Formula Ic is selected from:

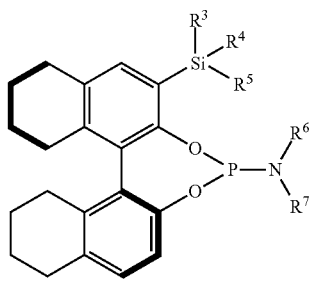

and

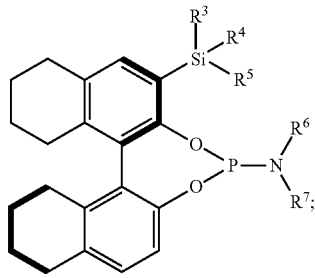

wherein all variables are as defined herein.

In some embodiments, the compound of Formula II is selected from a compound of Formula IId:

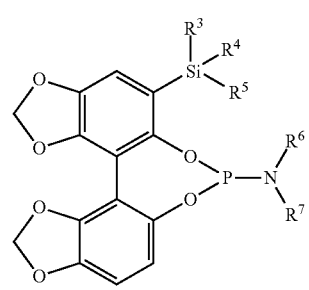
(IId)

wherein all variables are as defined herein.

In some embodiments, the compound of Formula IId is selected from:

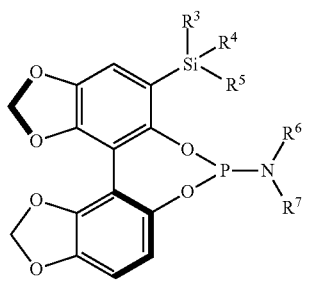

and

-continued

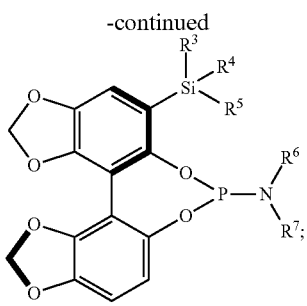

wherein all variables are as defined herein.

In some embodiments, the compound of Formula II is a compound of Formula IIe:

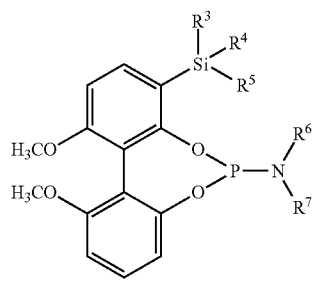

(Ie)

wherein all variables are as defined herein.

In some embodiments, the compound of Formula IIe is selected from:

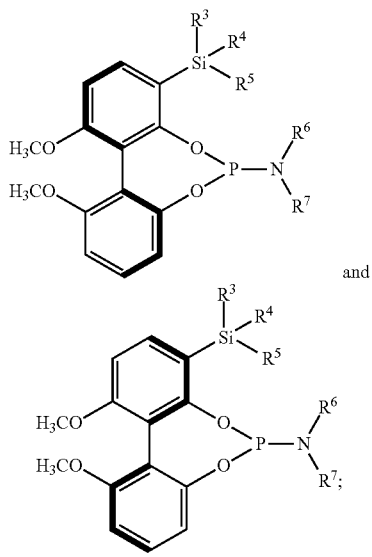

Wherein all variables are as defined herein.

In some embodiments of Formula I or Formula II, $R^3$ is alkyl. In some embodiments of Formula I or Formula II, $R^3$ is methyl. In some embodiments of Formula I or Formula II, $R^3$ is ethyl. In some embodiments of Formula I or Formula II, $R^3$ is isopropyl. In some embodiments of Formula I or Formula II, $R^3$ is n-octyl. In some embodiments of Formula I or Formula II, $R^3$ is aryl. In some embodiments of Formula I or Formula II, $R^3$ is phenyl.

In some embodiments of Formula I or Formula II, $R^4$ is alkyl. In some embodiments of Formula I or Formula II, $R^4$ is methyl. In some embodiments of Formula I or Formula II, $R^4$ is ethyl. In some embodiments of Formula I or Formula II, $R^4$ is isopropyl. In some embodiments of Formula I or Formula II, $R^4$ is n-octyl. In some embodiments of Formula I or Formula II, $R^4$ is aryl. In some embodiments of Formula I or Formula II, $R^4$ is phenyl.

In some embodiments of Formula I or Formula II, $R^3$ and $R^4$ are each methyl. In some embodiments of Formula I or Formula II, $R^3$ and $R^4$ are each ethyl. In some embodiments of Formula I or Formula II, $R^3$ and $R^4$ are each isopropyl. In some embodiments of Formula I or Formula II, $R^3$ and $R^4$ are each octyl. In some embodiments of Formula I or Formula II, $R^3$ and $R^4$ are each phenyl.

In some embodiments of Formula I or Formula II, $R^5$ is hydrogen. In some embodiments of Formula I or Formula II, $R^5$ is alkyl. In some embodiments of Formula I or Formula II, $R^5$ is alkenyl. In some embodiments of Formula I or Formula II, $R^5$ is alkenyl. In some embodiments of Formula I or Formula II, $R^5$ is alkynyl. In some embodiments of Formula I or Formula II, $R^5$ is $OR^a$. In some embodiments of Formula I or Formula II, $R^5$ is aryl. In some embodiments of Formula I or Formula II, $R^5$ is heteroaryl.

Representative examples of $R^5$ include, but are not limited to:

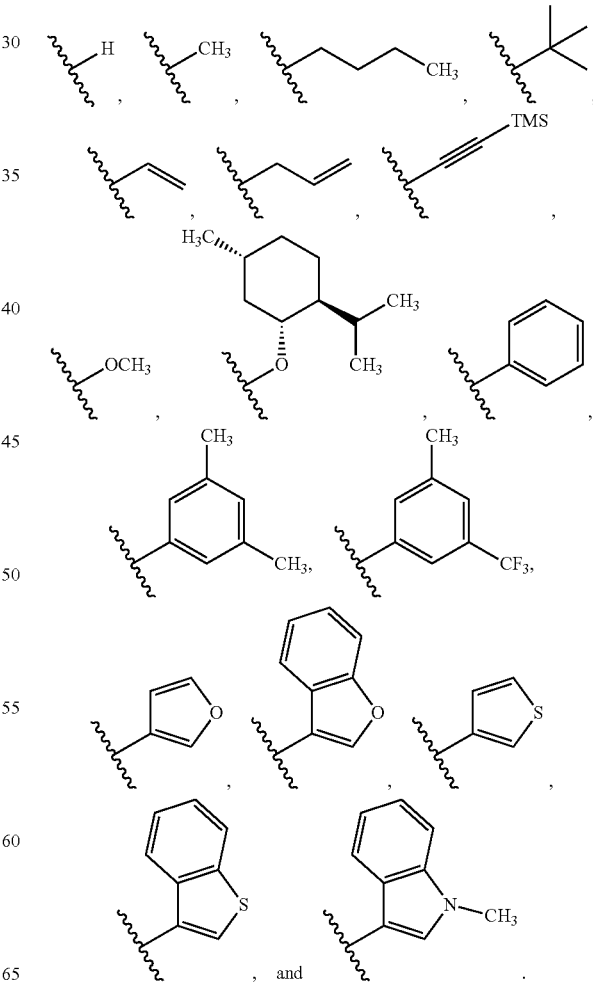

In some embodiments of Formula I or Formula II,

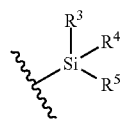

is selected from:

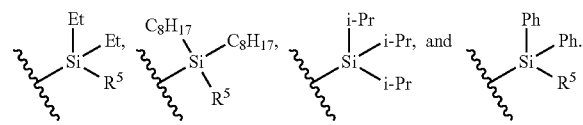

In some embodiments of Formula I or Formula II,

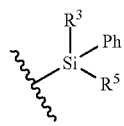

is selected from:

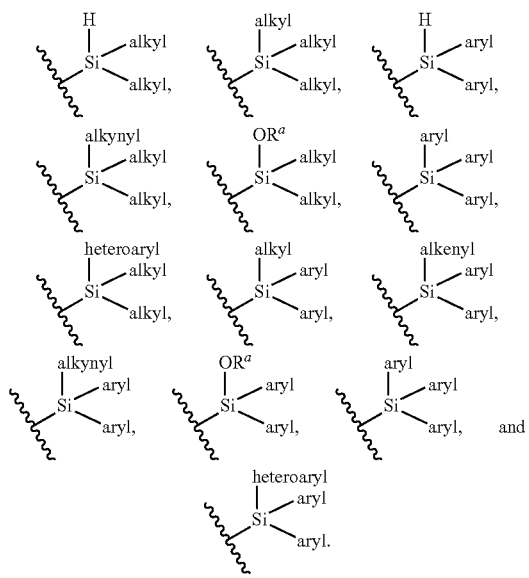

In some embodiments of Formula I or Formula II, $R^6$ is hydrogen. In some embodiments of Formula I or Formula II, $R^6$ is alkyl. In some embodiments of Formula I or Formula II, $R^6$ is methyl. or Formula II In some embodiments of Formula I, $R^6$ is isopropyl. In some embodiments of Formula I or Formula II, $R^6$ is benzyl. In some embodiments or Formula II, $R^6$ is 1-phenylethyl. In some embodiments or Formula II, $R^6$ is 1,1-diphenylmethyl. In some embodiments or Formula II, $R^6$ is 2-butylpentyl. In some embodiments or Formula II, $R^6$ is 1-indanyl.

In some embodiments of Formula I or Formula II, $R^7$ is hydrogen. In some embodiments of Formula I or Formula II, $R^7$ is alkyl. In some embodiments of Formula I or Formula II, $R^7$ is methyl. In some embodiments of Formula I or Formula II, $R^7$ is ethyl. In some embodiments of Formula I or Formula II, $R^7$ is isopropyl. In some embodiments of Formula I or Formula II, $R^7$ is benzyl. In some embodiments of Formula I or Formula II, $R^7$ is 1-phenylethyl. In some embodiments of Formula I or Formula II, $R^7$ is 1,1-diphenylmethyl. In some embodiments of Formula I or Formula II, $R^7$ is 2-butylpentyl. In some embodiments of Formula I or Formula II, $R^7$ is 1-indanyl.

In some embodiments of Formula I or Formula II, $R^6$ and $R^7$ are brought together with the carbon to which they are attached to form a piperidinyl ring.

In some embodiments of Formula I or Formula II,

is selected from:

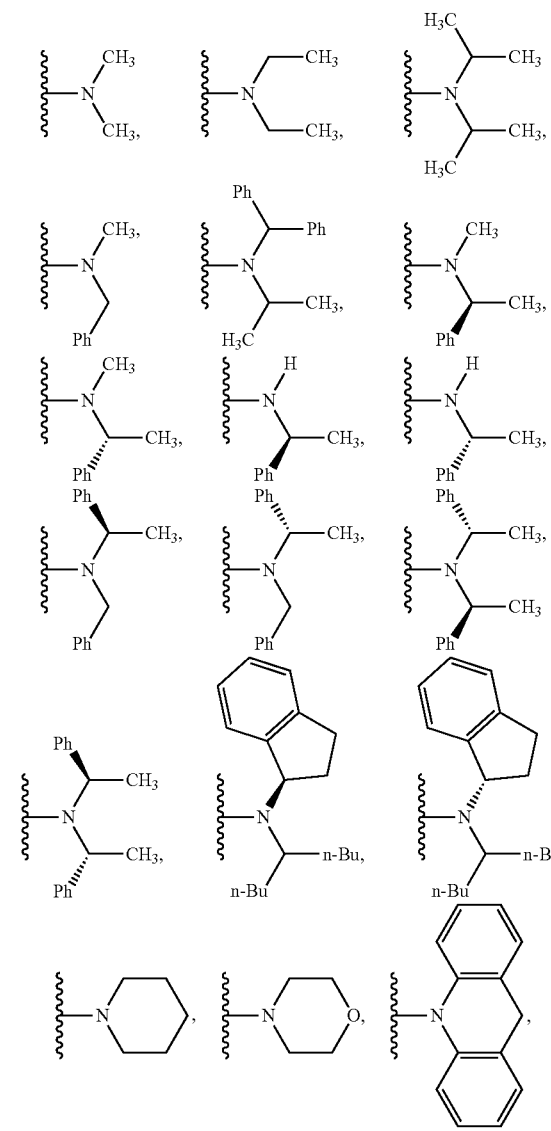

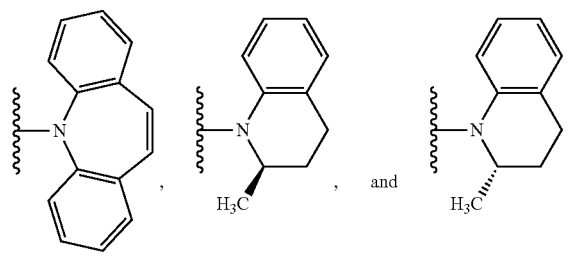
Representative examples of compounds of Formula I include, but are not limited to:
| Compound | Structure |
|---|---|
| A | 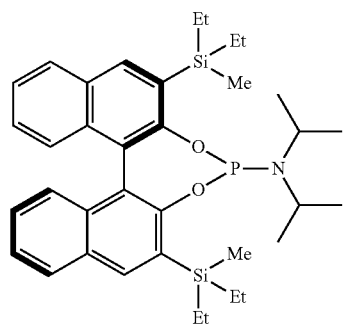 |
| B | 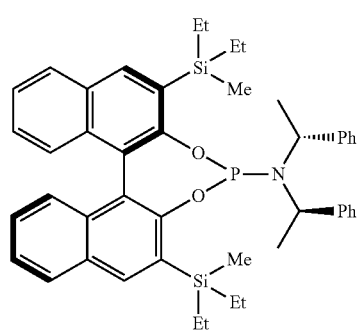 |
| C | 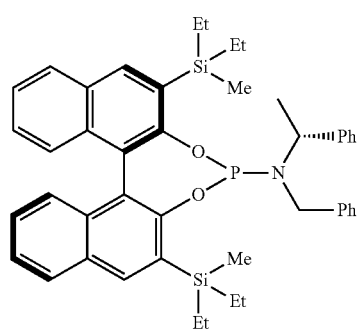 |
-continued
| Compound | Structure |
|---|---|
| D | |
| E | 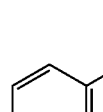 |
| F | |
Representative examples of compounds of Formula II include, but are not limited to:
| Compound | Structure |
|---|---|
| A-II | 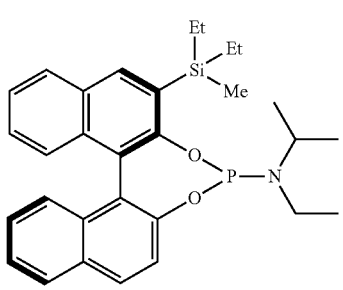 |

-continued

| Compound | Structure |
|---|---|
| B-II | 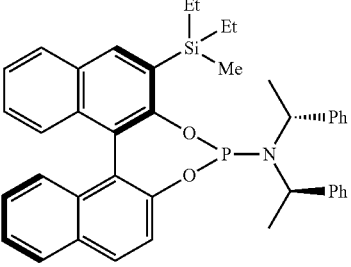 |
| C-II | 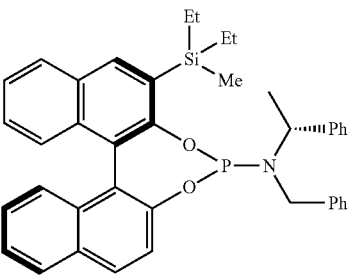 |
| D-II | 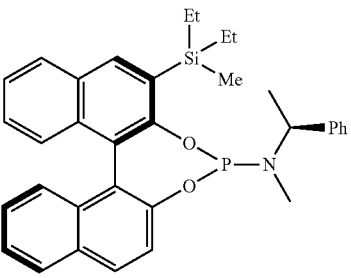 |
| E-II | 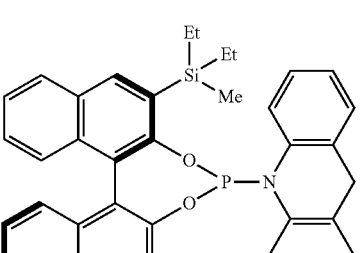 |
| F-II | 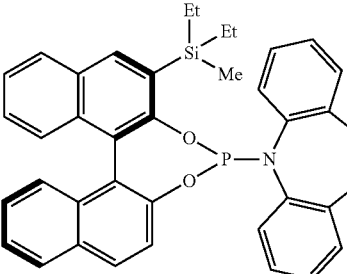 |

Methods of Making

Further provided herein is a process for the preparation of a compound of Formula I comprising:

(a) reacting a compound of Formula A

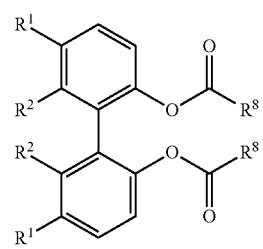

(A)

with a compound of Formula B

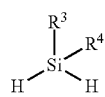

(B)

in the presence of an iridium catalyst to form a compound of Formula C

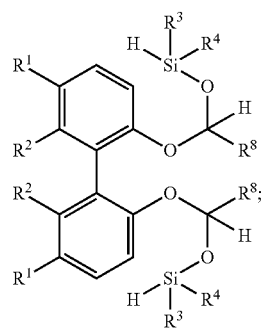

(C)

(b) reacting the compound of Formula C in the presence of a rhodium catalyst and norbornene to form a compound of Formula D

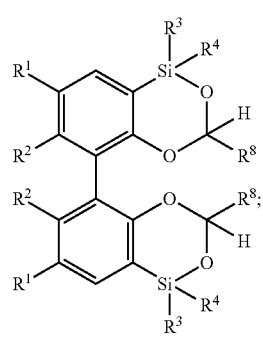

(D)

(c) reacting the compound of Formula D with an organometallic nucleophile R⁵-M to form a compound of Formula E

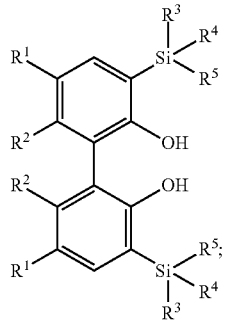
(E)

and (d) reacting the compound of Formula E with a compound of Formula F

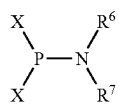
(F)

in the presence of a base to form a compound of Formula I;

wherein:

$R^8$ is selected at each occurrence from alkyl, cycloalkyl, aryl, or heteroaryl;

X is halogen (for example chloro or bromo); and all other variables are as defined herein.

In an alternative embodiment, a process is provided for the preparation of a compound of Formula II comprising:

(a) reacting a compound of Formula A

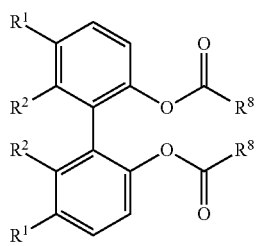
(A)

with a compound of Formula B

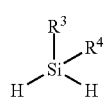
(B)

in the presence of an iridium catalyst to form a compound of Formula C

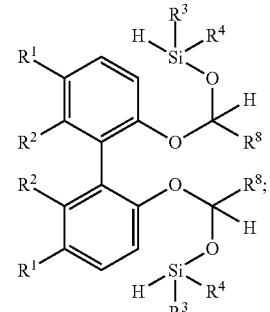
(C)

(b) reacting the compound of Formula C in the presence of a rhodium catalyst and norbornene to form a compound of Formula D

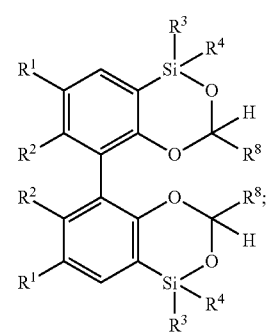
(D)

(c) reacting the compound of Formula D with an organometallic nucleophile R⁵-M to form a compound of Formula E-II

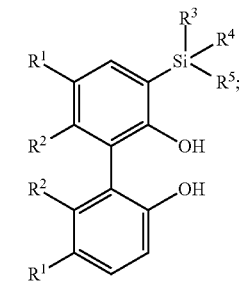
(E-II)

and (d) reacting the compound of Formula E-II with a compound of Formula F

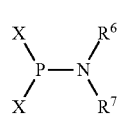
(F)

in the presence of a base to form a compound of Formula II;

wherein all variables are as defined herein.

In some embodiments, $R^8$ is alkyl. In some embodiments, $R^8$ is methyl.

In some embodiments, X is chloro. In some embodiments, X is bromo.

In some embodiments, the iridium catalyst comprises an iridium(I) catalyst. In some embodiments, the iridium catalyst comprises an iridium(I) dimer. In some embodiments, the iridium catalyst comprises di-μ-chlorotetrakis(cyclooctene)diiridium ([Ir(coe)$_2$Cl]$_2$).

In some embodiments, the rhodium catalyst comprises a rhodium(I) catalyst and a phosphine ligand. In some embodiments, the rhodium(I) catalyst comprises a rhodium (I) dimer. In some embodiments, the rhodium(I) dimer comprises bicyclo[2.2.1]hepta-2,5-diene-rhodium(I) chloride dimer ([Rh(nbd)Cl]$_2$). In some embodiments, the phosphine ligand comprises a monophosphine ligand. In some embodiments, the phosphine ligand comprises a triarylphosphine ligand. In some embodiments, the phosphine ligand comprises tris(4-methoxyphenyl)phosphine.

Representative examples of compounds of Formula E as may be formed during the above process include:

| Compound | |
|---|---|
| G | 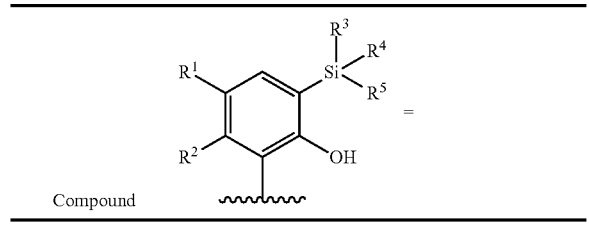 |
| H | 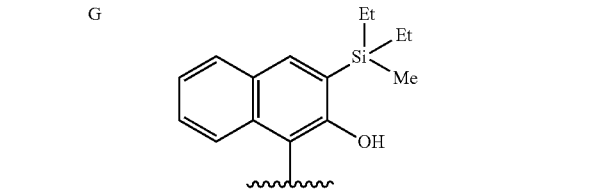 |
| I | 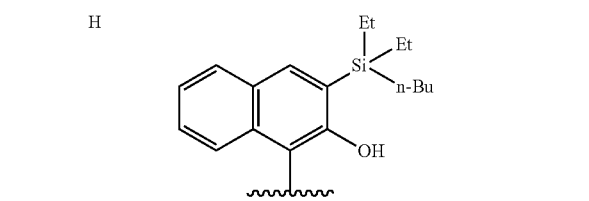 |
| J | 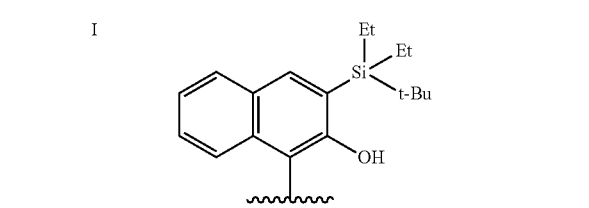 |

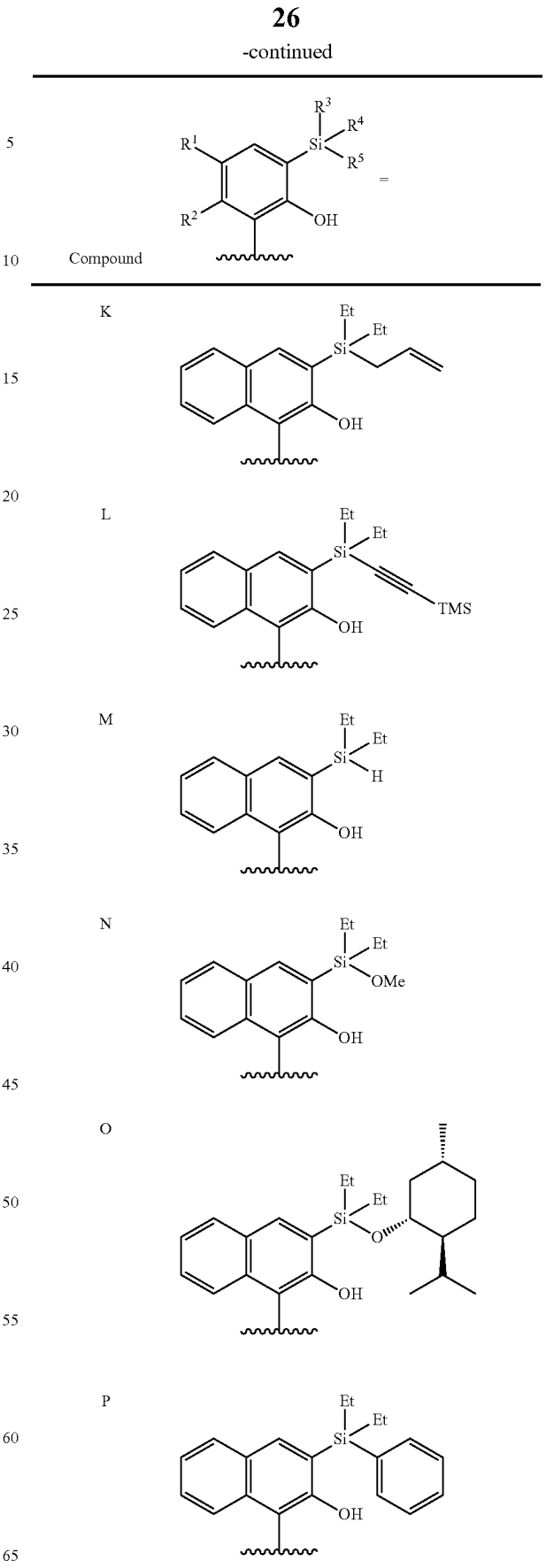

-continued
| Compound | |
|---|---|
| Q | 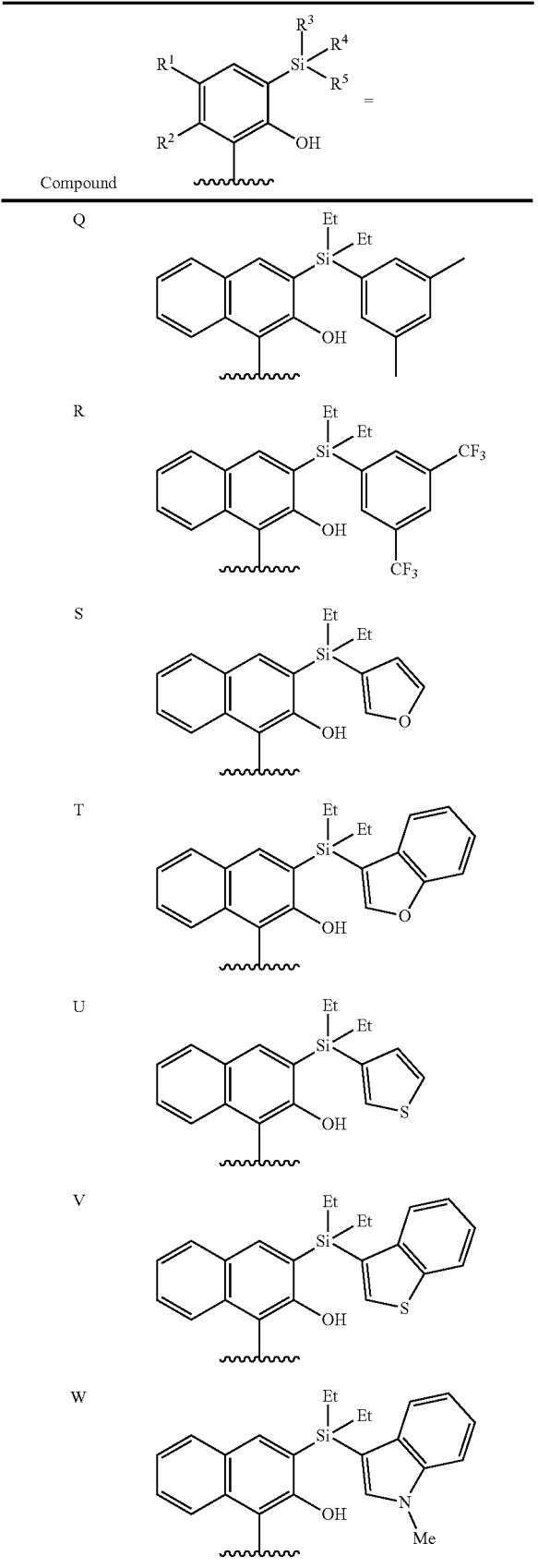 |
| R | |
| S | |
| T | |
| U | |
| V | |
| W | |
-continued
| Compound | |
|---|---|
| X | 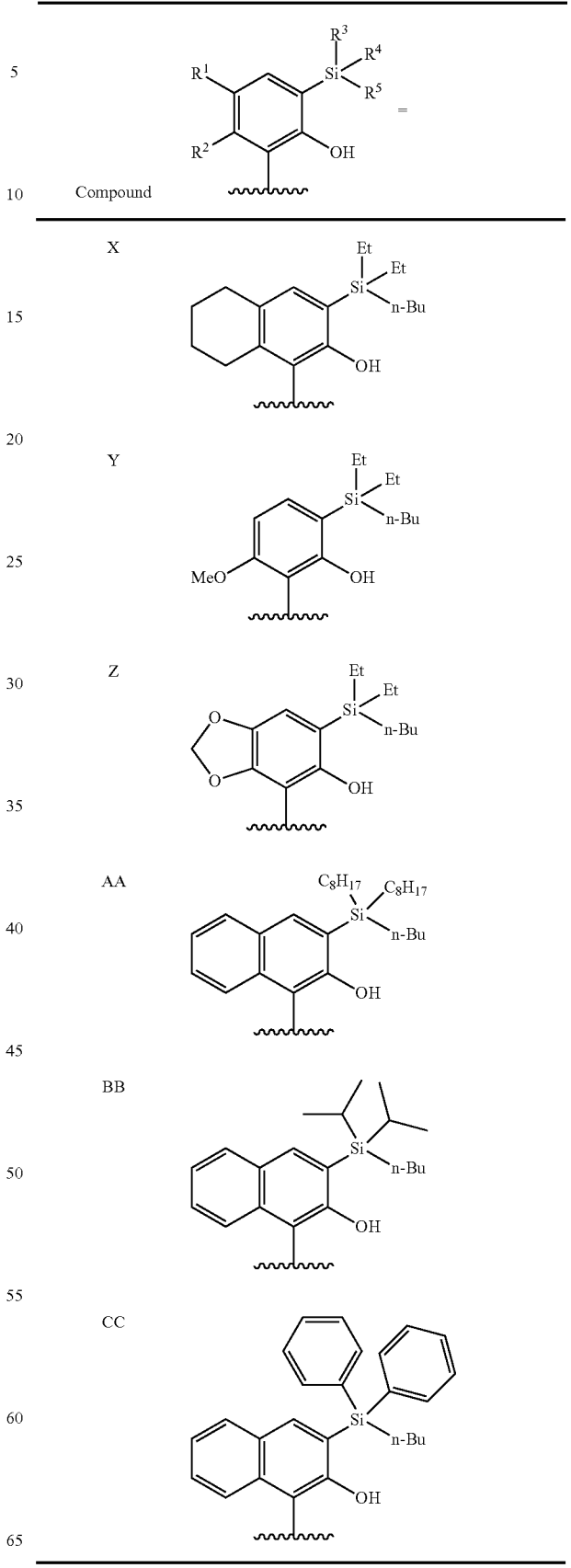 |
| Y | |
| Z | |
| AA | |
| BB | |
| CC | |

Representative examples of compounds of Formula E-II as may be formed during the above process include:
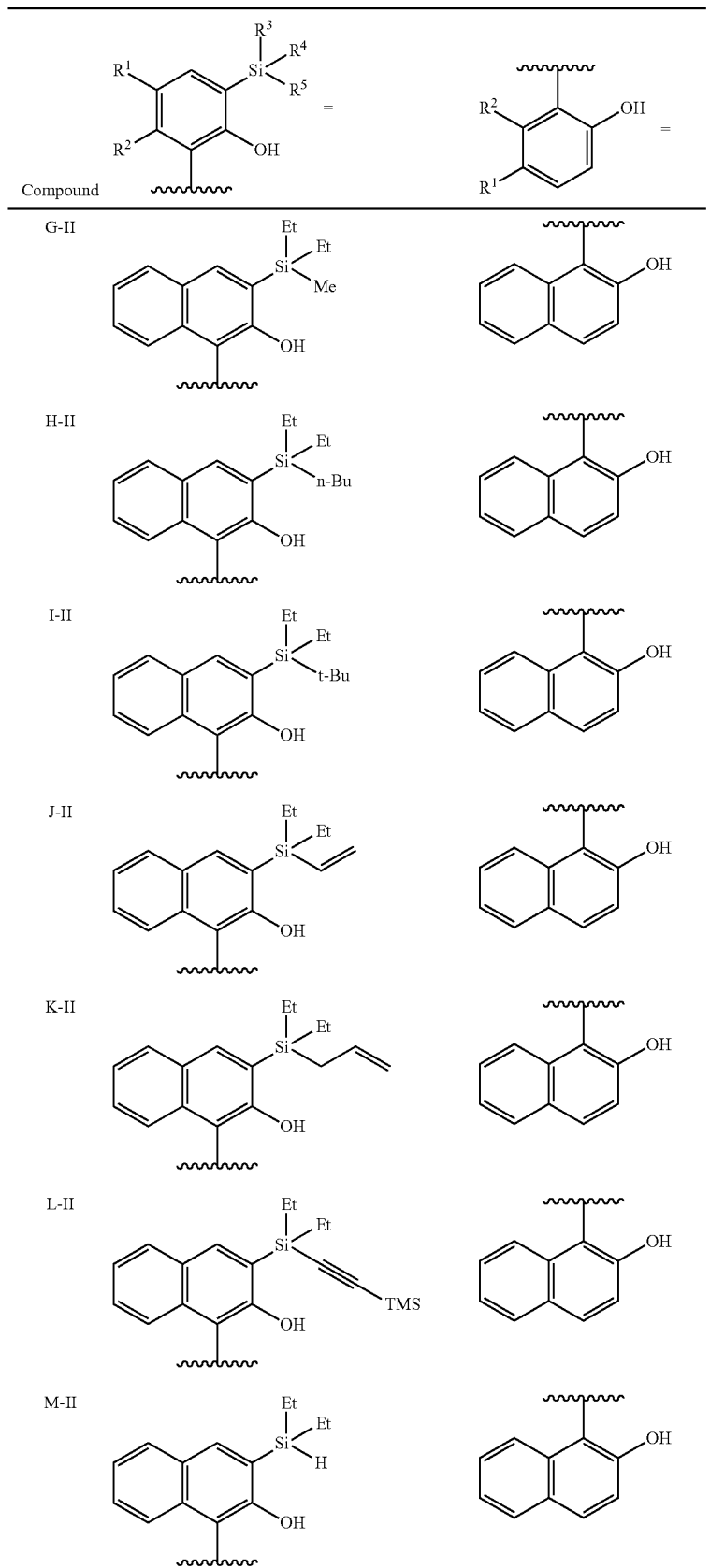

-continued
| Compound | 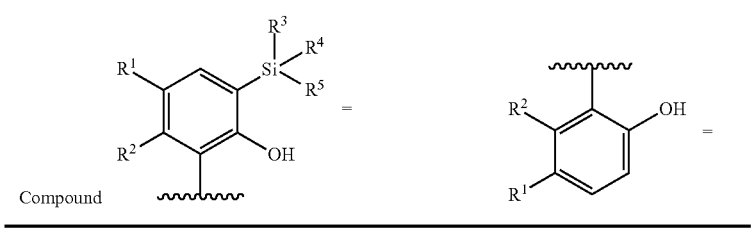 | = | |
|---|---|---|---|
N-II 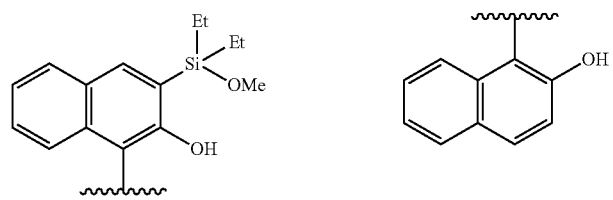
O-II 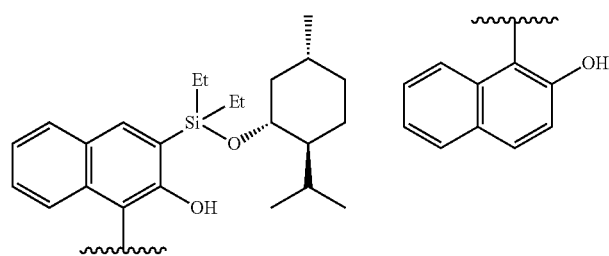
P-II 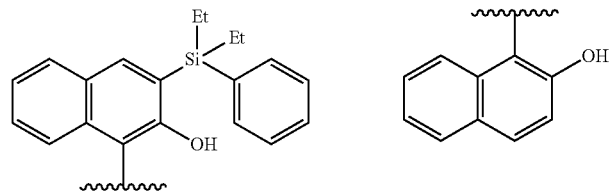
Q-II 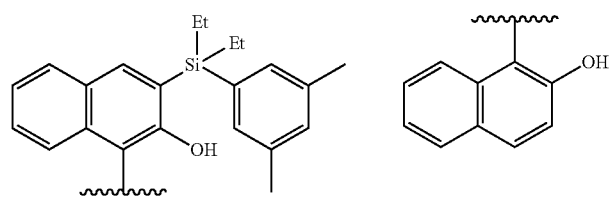
R-II 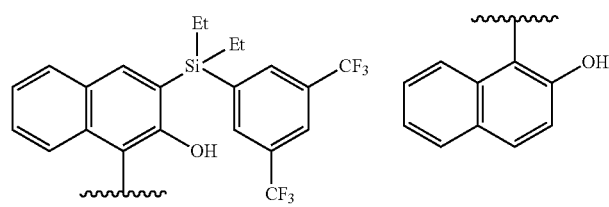
S-II 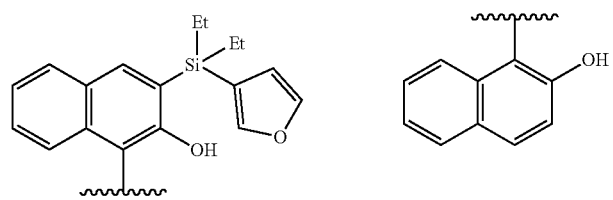

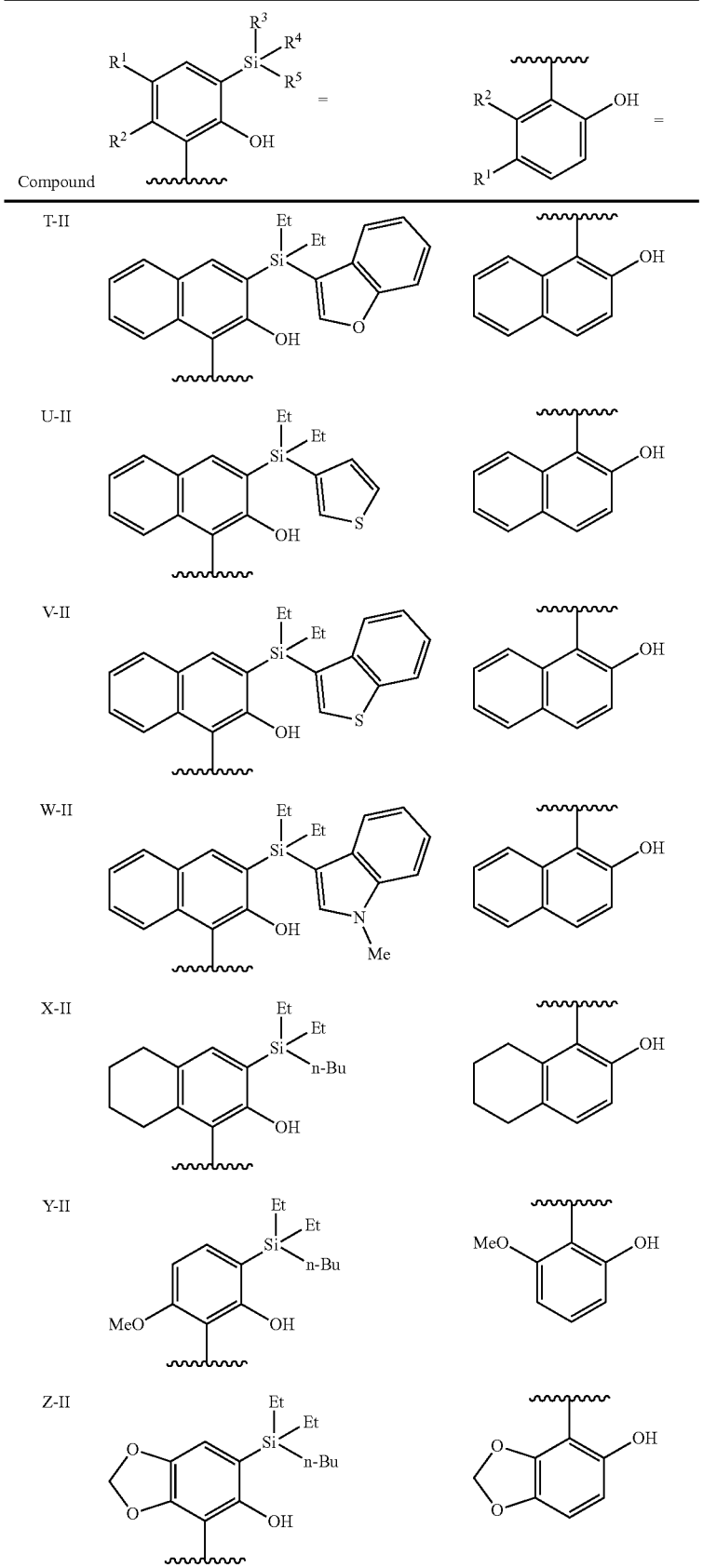

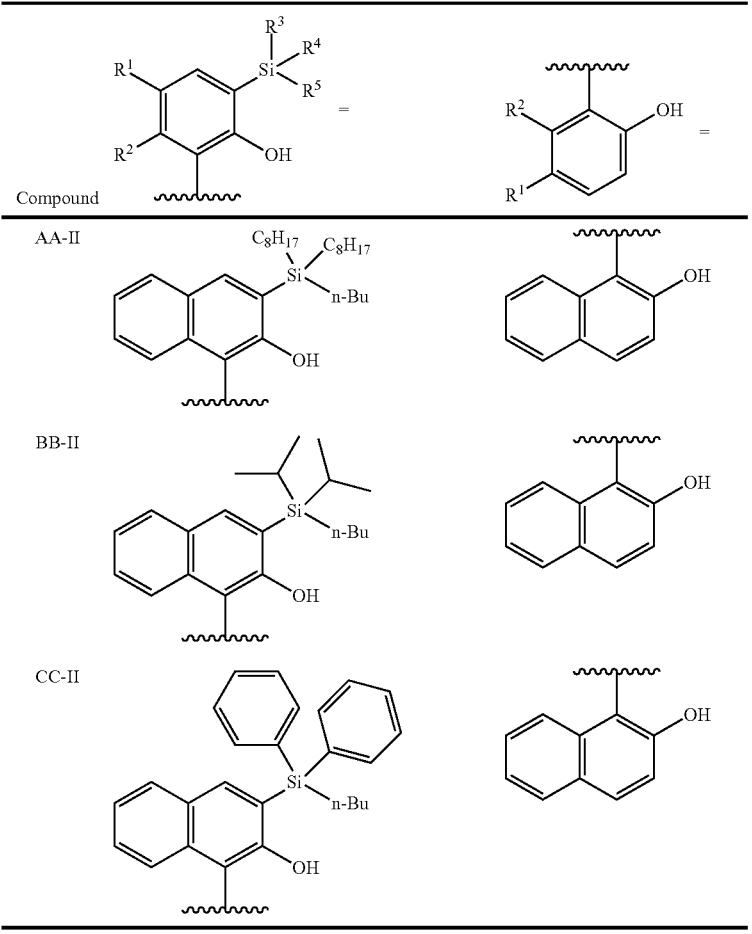

In the above processes, whether compound E or compound E-II is formed is dependent upon the temperature at which step (c) is performed. To form compound E, step (c) is performed at a temperature ranging from about −85 degrees Celsius to about −60 degrees Celsius. To instead form compound E-II, step (c) is allowed to warm to a temperature ranging from about 15 degrees Celsius to about 35 degrees Celsius.

By way of non-limiting illustration, examples of certain embodiments of the present disclosure are given below.

EXAMPLES

The present example is directed to catalytic strategies for rapid and modular preparation of a library of structurally new, axially chiral 3,3'-bis silyl BINOLS/biphenols 9 and 3,3'-bis-silyl BINOL/biphenol-based phosphoramidites 10. The proposed strategy implements two-fold ortho-C—H silylation of phenol derivatives with parallel installation and removal of sterically and electronically tunable functional groups to 3,3'-bis-silyl groups and a traceless acetal directing group, respectively.[16] Specifically, hydrosilyl acetal 11, prepared via Ir-catalyzed dual hydrosilylation of esters 8, functions as both a two-atom tether that allows site-specific dehydrogenative silylation to afford dioxasilines 12. In the same pot, a series of sterically and electronically varied anionic functional groups preferentially add to an electrophilic silicon center in 12, leading to the ejection of an aldehyde which would undergo a further addition reaction with nucleophiles. This reaction cascade ultimately produces axially chiral 3,3'-bis-silyl BINOLS 9 without the acetal directing group. With potential risk of protodesilylation, phosphoramidation of 9 provides 3,3'-bis-silyl phosphoramidites 10. See FIGS. 1a-1c.

Results and Discussion

Synthesis of 3,3'-Bis-Silyl-BINOLS

The disclosed approach to expeditious synthesis of 3,3'-bis-silyl-BINOLS/biphenols and 3,3'-bis-silyl-BINOLs/biphenol-based phosphoramidites initially centered on development of catalytic dual C—H silylation of readily available bis-acetyl (R)-BINOL 13 with a traceless directing group (Table 1). Dual IR-catalyzed ester hydrosilylation of 13 to afford bis-silyl acetal 14 is generally completed in 3-6 h in THF at 80° C. with 0.3 mol % of catalyst, and the succeeding, two-fold ortho-C—H silylation of 14 under Rh catalysis to provide bis-cyclic silyl acetal 15 (i.e., bis-dioxasilines) were completed within 30 min in THF at 120° C. in a closed vessel (Table 1). The resulting dioxasilines 15, formed as an inconsequential diastereomeric mixture (ca. 1.6:1.6:1:1.6), were chromatographically stable and could be stored for several weeks. Two-fold nucleophilic addition of a variety of nucleophiles to 15 was accomplished within 5 min in most cases, producing diverse 3,3'-bis-silyl-BINOLS 16 with moderate to good yields (17 examples, 30-87% yield, 3 steps, Table 1). In the last step, among other nucleophiles, organolithiums were generally found to be optimal for the ring opening of the dioxosilines 15 because of rapid product formation and minimal desilyation. Specifically, alkyl nucleophiles of varying steric hindrance were introduced by using their corresponding organolithium reagents to produce compounds 16a-c with good yields (Table 1a). Longer reaction times predominantly gave mono-desilylated products (ca. 95%). Vinyl and ally Grignard nucleophiles provided 3,3'-bis-silyl BINOLS 16d-e with moderated to good yields (Table 1b). Addition of lithium acetylide to 15 furnished 3,3'-bis-dethylalkynylsilyl BINOL 16f (Table 1b). Hydride and heteroatom nucleophiles were then examined (Table 1c). 3,3'-bis-hydrodiethylsilyl BINOL 16g was generated using LAH as the hydride nucleophile. Oxygen nucleophiles also underwent the reaction with diminishing yields of 16h and 16g because of competing desilylation. A key to success of the reaction with electronically and sterically varied aryl and heteroaromatic organolithium reagents was timely addition of the corresponding anions to the dioxosiline 15, because of the distinctive life-times of the reagents (Table 1d and 1e). Successful examples include lithium-benzene, 3,5-dimethylbenzene, 3,5-ditrifluoromethylbenzene, furan, benzofuran, thiophene, benzothiophene, and indole, leading to corresponding 3,3'-bisarylsilyl and 3,3'-bis-heteroaromatic silyl BINOLS 16j-r with moderate yields (3 steps). The facile introduction of heterocycles to the BINOL scaffold not only can alter its steric and electronic nature, but also can provide an additional metal binding element that controls stereofidelity and/or reactivity of catalytic transformations. However, the mesityllithium failed to add to 15 where either no reaction was observed or significant desilylation was detected upon forcing conditions. Interestingly, these compounds were generally less polar than the precursor, bis-cyclic silyl acetal, dioxosiline 15, suggesting that the silyl groups installed make the bis-phenoxy groups in 16 substantially less basic, and it is anticipated that these 3,3'-groups can directly influence a catalytic metal site that interacts with the bis-phenoxy groups. While most reactions can be done in a one-pot fashion (13 to 16), the reaction with LAH, methol, phenyl, and indole nucleophiles required semi-purification of the dioxosiline intermediates 15 (i.e., filtration through a plug of silica gel) to minimize mono-desilylation.

TABLE 1

Synthesis of 3,3'-Bis-Silyl BINOLs[a]

a. alkyl substituents

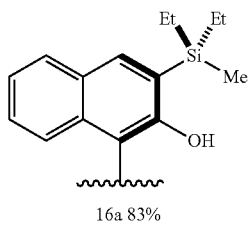

16a 83%

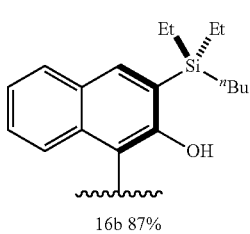

16b 87%

TABLE 1-continued

Synthesis of 3,3'-Bis-Silyl BINOLs[a]

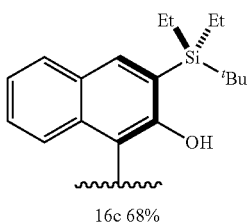

16c 68% b. vinyl, allyl, and alkynyl substituents

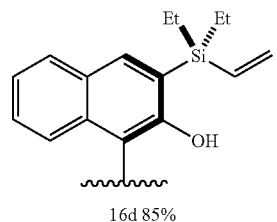

16d 85%

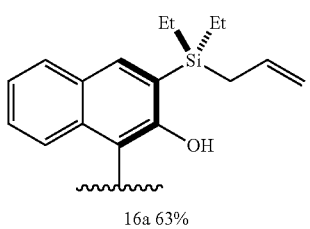

16a 63%

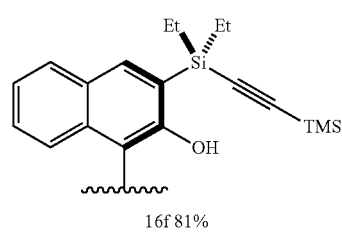

16f 81% c. hydrogen and heteroatomic substituents

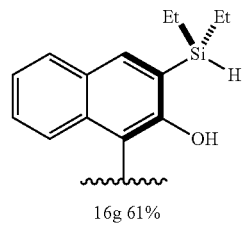

16g 61%

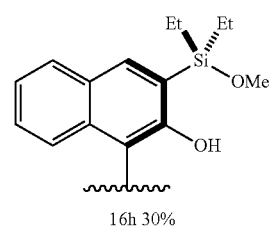

16h 30%

TABLE 1-continued

Synthesis of 3,3'-Bis-Silyl BINOLs[a]

16i 42% d. aryl substituents 16j 61%

16k 47%

16l 46% e. heterocyclic substituents 16m 59%

16o 57%

16p 57%

16q 50%

16r 68%

[a]Conditions: (i) [1,1'-binaphthalene]-2,2'-diyl diacetate 13 (0.4 mmol), [Ir(coe)$_2$Cl]$_2$ (0.3 mol %), H$_2$SiEt$_2$ (6 equiv), THF (1M), 80° C., 3-6 h. (ii) [Rh(nbd)Cl]$_2$ (1 mol %), P(4-OMePh)$_3$ (6 mol %), nbe (4 equiv), THF (1M), 120° C., 30-60 min. (iii) FG (6 equiv), THF (2M), −78° C., 5 min.

Synthesis of 3,3'-Bis-Silyl-Biphenols

Next, the scope was expanded of 3,3'-bis-silyl biphenol scaffold through catalytic C—H silylation of axially chiral biphenols with a traceless acetal directing group. Generally, slower reaction kinetics was observed with to reactions with BINOLs. This prompted reoptimization of the reaction conditions. NMR and TLC were used to monitor reaction completion. Specifically, the hydrosilylation and C—H activation required more time and was less efficient than BINOL, while the completion time for nucleophilic addition remained very fast. In this study, n-butyllithium was used a nucleophile for the dioxasilines (e.g., H8-BINOL, 6,6'-dimethoxy-1,1'-biphenyl-2,2'-diol, and bisdibenzodioxole-2,2'-diol) to provide the corresponding 3,3'-bis-silyl biphenols (18a-c) in moderate yields (Table 2).

TABLE 2

Synthesis of 3,3'Bis-silyl phenols via dual C—H silylation with a traceless acetal directing group[a]

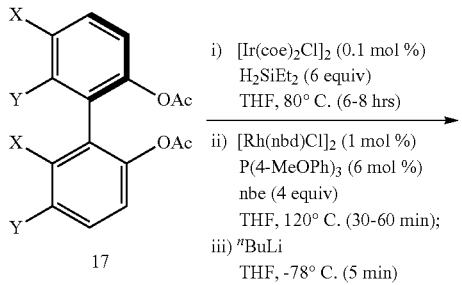

i) [Ir(coe)₂Cl]₂ (0.1 mol %)
   H₂SiEt₂ (6 equiv)
   THF, 80° C. (6-8 hrs)
ii) [Rh(nbd)Cl]₂ (1 mol %)
    P(4-MeOPh)₃ (6 mol %)
    nbe (4 equiv)
    THF, 120° C. (30-60 min);
iii) ⁿBuLi
     THF, -78° C. (5 min)

17

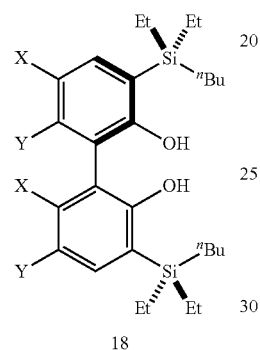

18

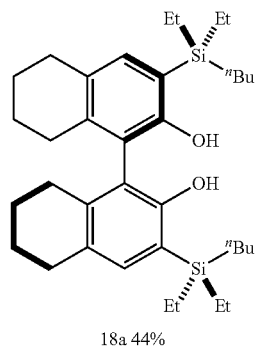

18a 44%

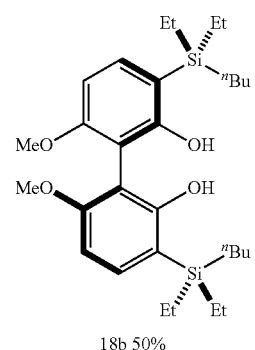

18b 50%

TABLE 2-continued

Synthesis of 3,3'Bis-silyl phenols via dual C—H silylation with a traceless acetal directing group[a]

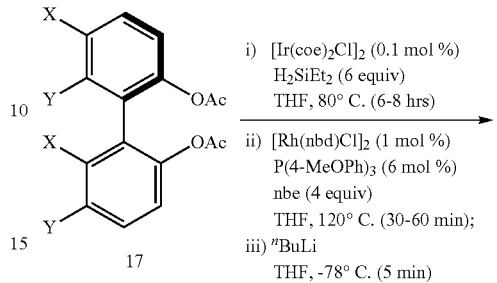

i) [Ir(coe)₂Cl]₂ (0.1 mol %)
   H₂SiEt₂ (6 equiv)
   THF, 80° C. (6-8 hrs)
ii) [Rh(nbd)Cl]₂ (1 mol %)
    P(4-MeOPh)₃ (6 mol %)
    nbe (4 equiv)
    THF, 120° C. (30-60 min);
iii) ⁿBuLi
     THF, -78° C. (5 min)

17

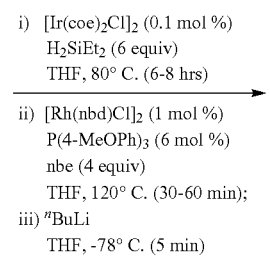

18

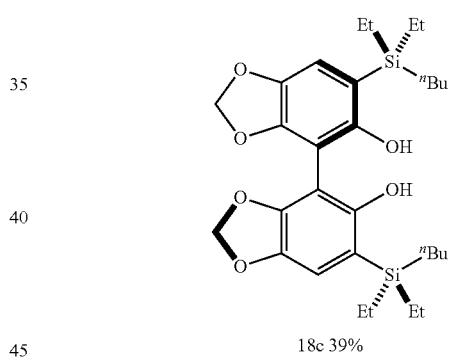

18c 39%

[a]Conditions: (i) [1,1'-binphenyl]-2,2'-diyl diacetate 17 (0.4 mmol), [Ir(coe)₂Cl]₂ (0.3 mol %), H₂SiEt₂ (6 equiv), THF (1M), 80° C., 6-8 h. (ii) [Rh(nbd)Cl]₂ (1 mol %), P(4-OMePh)₃ (6 mol %), nbe (4 equiv), THF (1M), 120° C., 30-60 min. (iii) ⁿBuLi(6 equiv), THF (2M), −78° C., 5-10 min.

Synthesis of 3,3'-Bis-Silyl-BINOLs with different silane reagents

Sterically and electronically different silane reagents were examined to expand the scope of the reaction. Some of these agents are commercially available or readily prepared through reduction of dichlorosilanes. Dihydrodioctylsilane [H₂Si(oct)₂] and dihydrodiisopropylsilane [H₂Si(ⁱPr)₂] slowed down the ester hydrosilylation step significantly under standard Ir catalysis conditions. Under the identical conditions, dihydrodiphenylsilane [H₂SiPh₂] reacted with 17 very fast, but reaction produced disiloxane by-products quickly, which resulted in low yield in C—H silylation. The electron-withdrawing nature of the phenyl groups could contribute to formation of the by-products.

TABLE 3

Scope of dihydrosilanes[a]

Compound 13 → i) [Ir(coe)₂Cl]₂ (0.1 mol %), H₂SiR₂ (6 equiv), THF, 80° C. (8-24 hrs); ii) [Rh(nbd)Cl]₂ (1 mol %), P(4-MeOPh)₃ (6 mol %), nbe (4 equiv), THF, 120° C. (30-60 min); iii) ⁿBuLi, THF, -78° C. (5 min) → 19

19a 37%

19b 45%

19c 11%[c]

[a]Conditions: (i) [1,1'-binaphthalene]-2,2'-diyl diacetate 13 (0.4 mmol), [Ir(coe)₂Cl]₂ (0.3 mol %), H₂SiR₂ (6 equiv), THF (1M), 80° C., 8-24 h. (ii) [Rh(nbd)Cl]₂ (1 mol %), P(4-OMePh)₃ (6 mol %), nbe (4 equiv), THF (1M), 120° C., 30-60 min. (iii) ⁿBuLi (6 equiv), THF (2M), −78° C., 5 min.
[c]NMR yield.

Synthesis of 3,3'-Bis-Silyl-BINOL-based Phosphoramidites

Upon establishing preparation of axially chiral 3,3'-bis-silyl BINOLs/biphenols, the phosphoramidation step to afford 3,3'-bis-silyl BINOL/biphenol-based phosphoramidites 20 was explored. Initial attempts at this step involved a reaction of 5a with PCl₃ under basic conditions, to form phosphorochloridite, then formation of a P—N bond to provide 20a. However, the reaction ultimately failed to produce the corresponding phosphoramidite 20a because of significant desilylation of 3,3'-bis-silyl-BINOL. Alternatively, a method was explored comprising making a P—N bond first by a reaction of secondary amine with PCl₃ to afford the corresponding dichlorophosphinamine, then forming the P—O bonds under buffered conditions. This method successfully generated 3,3'-bis-silyl BINOL-based phosphoramidite 20a with moderate yield, mainly because of the reduced reactivity by steric bulk of the 3,3'-bis-silyl moieties. X-ray crystallography confirmed the structure of 20a, 20e and 20f. Despite the complex NMR spectrum of the compound 20, possibly due to rotamers, an X-ray structure of this molecule was obtained which helps better understand the overall topological conformation of the two silyl groups within the ligands.

The substrate scope of this transformation was expanded to sequential traceless hydrosilyl acetal-directed dual C—H silylation/phosphoramidation. 3,3'-Bis-silyl BINOL-based phosphoramidite derivatives were successfully synthesized with moderate to good yield (6 examples, 55-76% yields). While Segphos (abbreviation) is one of the most widely used bisphosphine ligands for asymmetric catalysis, the structurally related 3,3'-bis-silyl bis-dibenzodioxole-2,2'-diol-containing phosphoramidite ligands (i.e. 20) have been surprisingly unknown. A synthesis of this ligand with the strategy proposed will be explored. Finally, structurally different amines will be investigated in phosphoramidation. X-ray structure of all new structures will be obtained to better understand the overall topological conformation of the two silyl groups within the ligands.

TABLE 4

Synthesis of 3,3'-bis-Silyl Phosphoramidites[a]

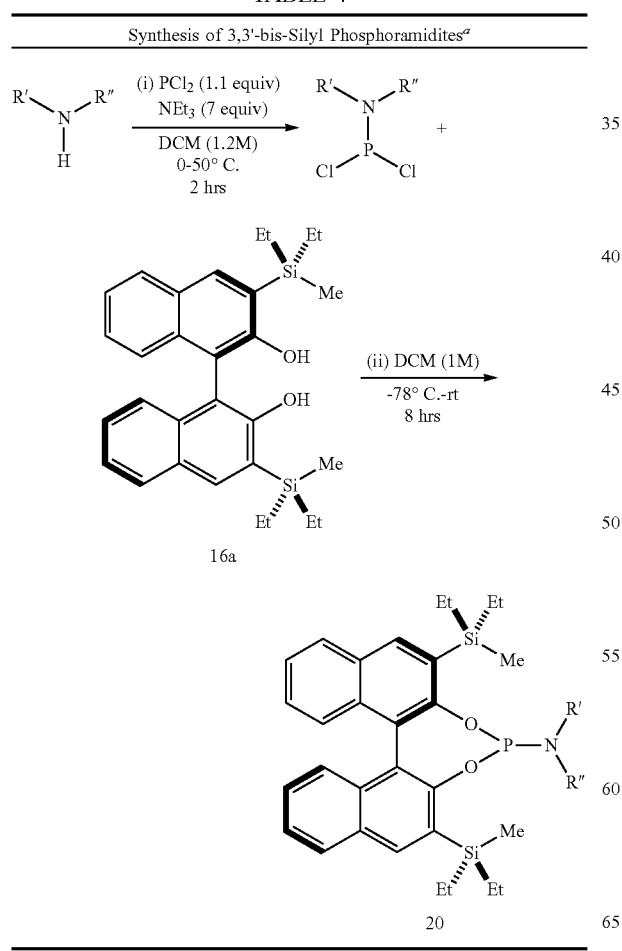

TABLE 4-continued
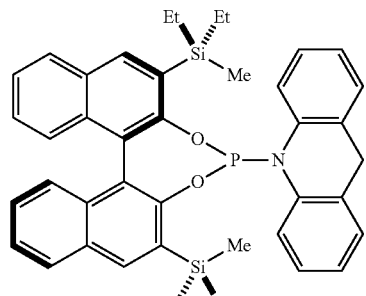
20e 71%
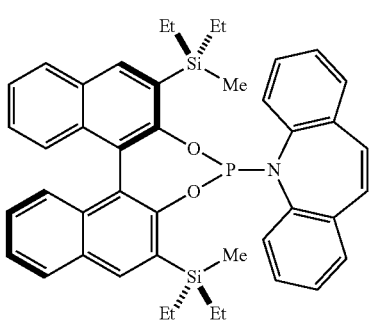
20f 76%
<sup>a</sup>Conditions: (i) R'R"NH (1.2 mmol), PCl₃ (1.1 equiv), NEt₃ (7 equiv), DCM (1.2 M), 0-50° C., 2 h. (ii) 5a (1 equiv), DCM (1M), −78° C.-rt, 8 h.
TABLE 5
Synthesis of 3-Silyl-BINOL-based Phosphoramides<sup>a</sup>
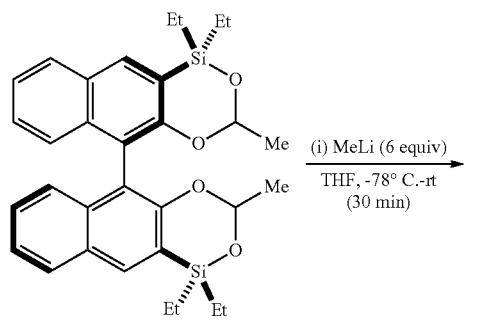
21 85%
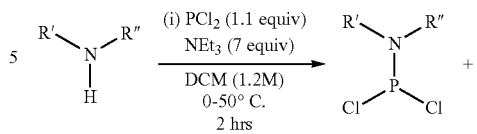
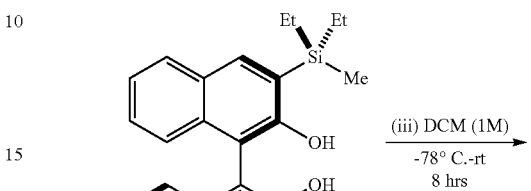
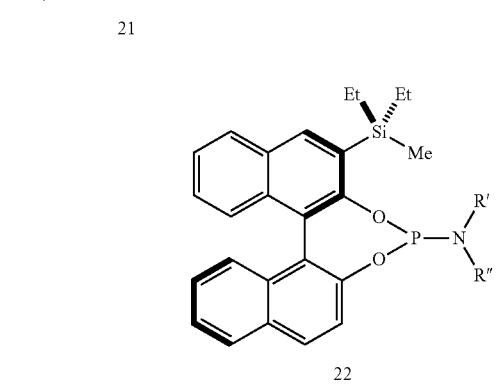
22
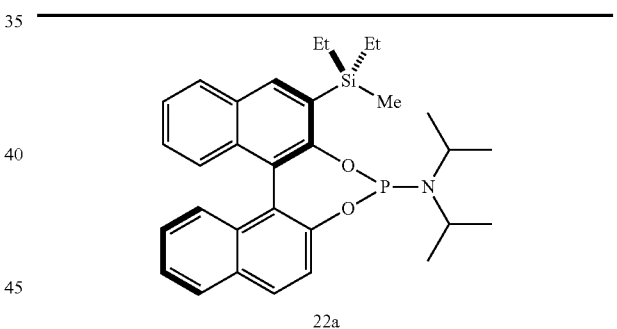
22a
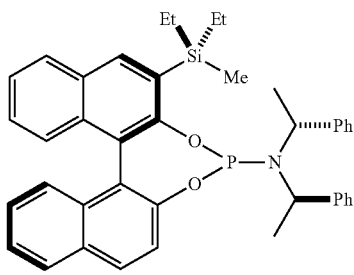
22b TABLE 5-continued

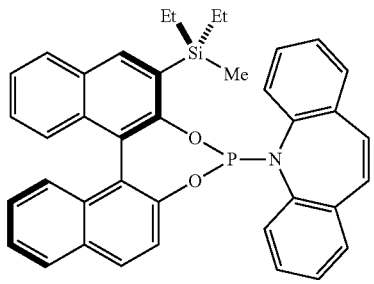

22c

CONCLUSION

A unified strategy to access a range of 3,3' bis-silyl-substituted BINOLs are developed. The disclosed approach to access the 3,3'-functionalized BINOLs centers on use of dioxasilines as a key intermediate generated through catalytic reductive 3,3'-bis-C—H silylation with a traceless acetal directing group. The same method was also compatible with a variety of different biphenols. The scope of silane was found to be limited to electron-rich substituents. Furthermore, phosphoramidites derivatives of 3,3'-silyl-BINOL were successfully synthesized with good yields. These compounds are the first of their kind, which allows room for more investigation of their properties and reactivity. The disclosed approach requires short synthetic steps, minimum purifications and is capable of providing a large set of this derivative library.

REFERENCES

Each of the below publications is hereby incorporated herein by reference in its entirety for all purposes.
1. McConathy, J.; Owens, M. J., Stereochemistry in Drug Action. *Prim Care Companion J Clin Psychiatry* 2003, 5, 70-73.
2. Baker, G. B.; Prior, T. I., Stereochemistry and drug efficacy and development: relevance of chirality to antidepressant and antipsychotic drugs. *Annals of Medicine* 2002, 34, 537-543.
3. Sekhon, B. S., Exploiting the Power of Stereochemistry in Drugs: An Overview of Racemic and Enantiopure Drugs. *J. Mod. Med. Chem.* 2013, 1, 10-36.
4. Hutt, A. G.; O'Grady, J., Drug chirality: a consideration of the significance of the stereochemistry of antimicrobial agents. *Journal of Antimicrobial Chemotherapy* 1996, 37, 7-32.
5. Brunel, J. M., BINOL: A Versatile Chiral Reagent. *Chemical Reviews* 2005, 105, 857-898.
6. Chen, Y.; Yekta, S.; Yudin, A. K., Modified BINOL Ligands in Asymmetric Catalysis. *Chemical Reviews* 2003,103, 3155-3212.
7. Teichert, J. F.; Feringa, B. L., Phosphoramidites: Privileged Ligands in Asymmetric Catalysis. *Angewandte Chemie International Edition* 2010, 49, 2486-2528.
8. Tang, W.; Zhang, X., New Chiral Phosphorus Ligands for Enantioselective Hydrogenation. *Chemical Reviews* 2003, 103, 3029-3070.
9. Feringa, B. L., Phosphoramidites: Marvellous Ligands in Catalytic Asymmetric Conjugate Addition. *Accounts of Chemical Research* 2000, 33, 346-353.
10. Hulst, R.; de Vries, N. K.; Feringa, B. L., α-Phenylethylamine based chiral phospholidines; new agents for the determination of the enantiomeric excess of chiral alcohols, amines and thiols by means of 31P NMR. *Tetrahedron: Asymmetry* 1994, 5, 699-708.
11. Cram, D. J.; Helgeson, R. C.; Peacock, S. C.; Kaplan, L. J.; Domeier, L. A.; Moreau, P.; Koga, K.; Mayer, J. M.; Chao, Y., Host-guest complexation. 8. Macrocyclic polyethers shaped by two rigid substituted dinaphthyl or ditetralyl units. *The Journal of Organic Chemistry* 1978, 43, 1930-1946.
12. Kyba, E. P.; Gokel, G. W.; De Jong, F.; Koga, K.; Sousa, L. R.; Siegel, M. G.; Kaplan, L.; Sogah, G. D. Y.; Cram, D. J., Host-guest complexation. 7. The binaphthyl structural unit in host compounds. *The Journal of Organic Chemistry* 1977, 42, 4173-4184.
13. Cox, P. J.; Wang, W.; Snieckus, V., Expedient route to 3- and 3, 3-substituted 1, 1-bi-2-naphthols by directed ortho metalation and suzuki cross coupling methods. *Tetrahedron Lett.* 1992, 33, 2253-2256.
14. Maruoka, K.; Itoh, T.; Araki, Y.; Shirasaka, T.; Yamamoto, H., Efficient Synthesis of Sterically Hindered Chiral Binaphthol Derivatives. *Bull. Chem. Soc. Jpn.* 1988, 61, 2975-2976.
15. Nguyen, H. N.; Lee, H.; Audörsch, S.; Reznichenko, A. L.; Nawara-Hultzsch, A. J.; Schmidt, B.; Hultzsch, K. C., Asymmetric Intra- and Intermolecular Hydroamination Catalyzed by 3,3'-Bis(trisarylsilyl)- and 3,3'-Bis(arylalkylsilyl)-Substituted Binaphtholate Rare-Earth-Metal Complexes. *Organometallics* 2018, 37, 4358-4379.
16. Mercier, A.; Yeo, W. C.; Chou, J.; Chaudhuri, P. D.; Bernardinelli, G.; Kündig, E. P., Synthesis of highly enantiomerically enriched planar chiral ruthenium complexes viaPd-catalysed asymmetric hydrogenolysis. *Chemical Communications* 2009, 5227-5229.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:
1. A compound of Formula Ib:

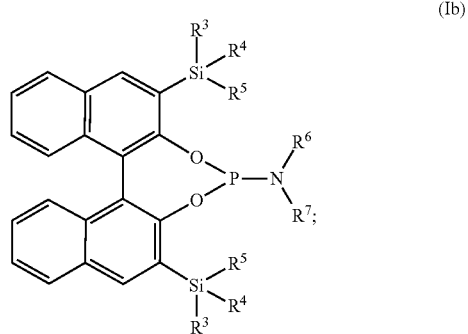

wherein:
$R^3$ and $R^4$ are each ethyl;
$R^5$ is selected from:

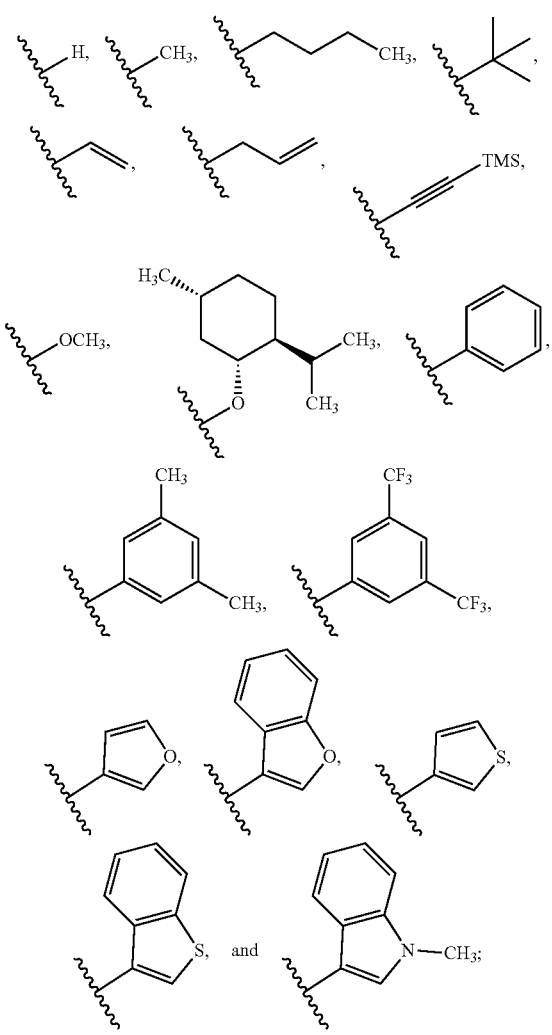

$R^6$ and $R^7$ are each independently selected from an alkyl, alkenyl, alkynyl, cycloalkyl, heterocycloalkyl, cycloalkenyl, heterocycloalkenyl, aryl, or heteroaryl group, each of which may be optionally substituted with one or more $R^z$ groups as allowed by valence;

or $R^6$ and $R^7$ are brought together with the nitrogen to which they are attached to form a heterocycloalkyl, heterocycloalkenyl or heteroaryl ring, each of which may be optionally substituted one or more $R^z$ groups as allowed by valence;

$R^a$ and $R^b$ are independently selected at each occurrence from a hydrogen, alkyl, alkenyl, alkynyl, cycloalkyl, heterocycloalkyl, cycloalkenyl, heterocycloalkenyl, aryl, or heteroaryl group, each of which except for hydrogen may be optionally substituted with one or more $R^d$ groups as allowed by valence;

$R^c$ is independently selected at each occurrence from —$R^a$, —$OR^a$, or -$NR^aR^b$;

$R^d$ is independently selected at each occurrence from halo, azido, alkyl, alkoxy, alkenyl, alkynyl, cycloalkyl, cycloalkenyl, heterocycloalkyl, heterocycloalkenyl, aryl, heteroaryl, aldehyde, amino, carboxylic acid, ester, ether, halide, hydroxy, ketone, nitro, silyl, sulfo-oxo, sulfonyl, sulfone, sulfoxide, and thiol; and $R^y$ and $R^z$ are independently selected at each occurrence from halo, nitro, cyano, —$R^a$, —$OR^a$, —$SR^a$, —$NR^aR^b$, —$C(O)R^c$, —$OC(O)R^c$, —$N(R^b)$—$C(O)R^c$, —$S(O)R^c$, —$OS(O)R^c$, —$N(R^b)$—$S(O)R^c$, —$S(O)_2R^c$, —$OS(O)_2R^c$, and —$N(R^b)$—$S(O)_2R^c$.

2. The compound of claim 1, wherein

is selected from:

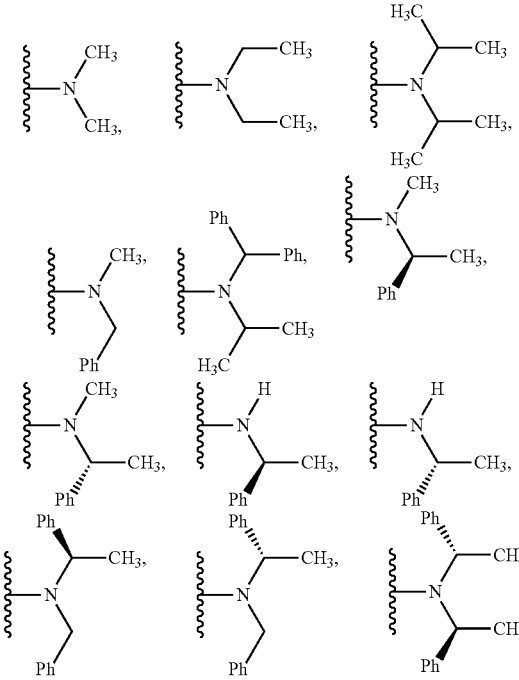

3. The compound of claim 1, wherein the compound is selected from: